(12) United States Patent
Gassmann et al.

(10) Patent No.: US 6,769,506 B2
(45) Date of Patent: *Aug. 3, 2004

(54) ALL WHEEL DRIVE SYSTEM FOR A MOTOR VEHICLE

(75) Inventors: Theodore Gassmann, Rochester, MI (US); Brent Peura, Farmington, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/205,543

(22) Filed: Jul. 25, 2002

(65) Prior Publication Data

US 2003/0146034 A1 Aug. 7, 2003

Related U.S. Application Data

(63) Continuation of application No. 09/454,260, filed on Dec. 3, 1999, now Pat. No. 6,547,025, which is a continuation-in-part of application No. 09/272,093, filed on Mar. 18, 1999, now Pat. No. 6,209,673.

(51) Int. Cl.⁷ ............................................. B60K 17/344
(52) U.S. Cl. ...................................................... 180/248
(58) Field of Search ................................. 180/244–247

(56) References Cited

U.S. PATENT DOCUMENTS

| | | | |
|---|---|---|---|
| 4,601,359 A | * | 7/1986 | Weismann et al. ............ 180/233 |
| 4,605,087 A | | 8/1986 | Ashauer et al. |
| 4,848,508 A | | 7/1989 | Smirl et al. |
| 4,867,260 A | * | 9/1989 | Cameron et al. ............. 180/360 |
| 4,899,859 A | * | 2/1990 | Teraoka ....................... 192/221 |
| 5,195,604 A | | 3/1993 | Brockett et al. |
| 5,526,912 A | | 6/1996 | Gassmann |
| 5,782,328 A | | 7/1998 | Fogelberg et al. |
| 5,791,446 A | | 8/1998 | Hagiwara et al. |
| 6,209,673 B1 | * | 4/2001 | Barlage et al. ............. 180/248 |
| 6,412,589 B1 | * | 7/2002 | Barlage et al. ............. 180/377 |
| 6,547,025 B1 | * | 4/2003 | Gassmann et al. .......... 180/248 |

OTHER PUBLICATIONS

SAE Technical Paper Series, numbered 890524, and entitled: "Applications of Viscous Coupling for Traction Control in Passenger Cars", by H. Taureg and G. Herrmann.
SAE paper entitled VISCO–LOK: A Speed–Sensing Limited–Slip Device with High Torque Progressive Engagement, by Theodor Gassmann and John Barlage.

* cited by examiner

Primary Examiner—Lesley D. Morris
Assistant Examiner—Paul Royal, Jr.
(74) Attorney, Agent, or Firm—Dinnin & Dunn, P.C.; Mick A. Nylander

(57) ABSTRACT

An all wheel drive system for a motor vehicle having a front differential and rear differential, a pair of front and rear halfshaft assemblies, a power takeoff unit, a constant velocity joint connected to the power takeoff unit, a first propshaft, a plunging constant velocity joint, a second propshaft, a flexible coupling, a self contained speed sensing torque transfer assembly connected to the flexible coupling wherein torque is selectively transferrable when the self contained speed sensing torque transfer assembly is engaged, and a torque arm assembly.

13 Claims, 34 Drawing Sheets

ALL WHEEL DRIVE SYSTEM FOR A MOTOR VEHICLE

A continuation application under 37 C.F.R. § 1.53(b) of prior application Ser. No. 09/454,260 filed on Dec. 3, 1999 now U.S. Pat. No. 6,547,025 entitled ALL WHEEL DRIVE SYSTEM FOR A MOTOR VEHICLE.

Which is a continuation in part application of Ser. No. 09/272,093, filed Mar. 18, 1999 now U.S. Pat. No. 6,209,673, and entitled "All Wheel Drive System for a Motor Vehicle".

TECHNICAL FIELD

The present invention relates to an all wheel drive system for a motor vehicle and more specifically, to an all wheel drive system including a pair of front halfshaft assemblies, a power take-off unit, a first propshaft assembly, a second propshaft assembly, a means for controlling torque transmission from the front halfshaft assemblies to the rear halfshaft assemblies, a rear differential, a pair of rear halfshaft assemblies and a torque arm mounting system.

BACKGROUND ART

There are generally four (4) main types of automotive driveline systems. More specifically, there exists a full-time front wheel drive system, a full-time rear wheel drive system, a part-time four wheel drive system, and an all wheel drive system. Most commonly, the systems are distinguished by the delivery of power to different combinations of drive wheels, i.e., front drive wheels, rear drive wheels or some combination thereof. In addition to delivering power to a particular combination of drive wheels, most drive systems permit the respectively driven wheels to rotate at different speeds. For example, the outside wheels must rotate faster than the inside drive wheels, and the front wheels must normally rotate faster than the rear drive wheels while driving in a corner.

Often, the inside and outside drive wheels of a two wheel drive system are connected to a differential mechanism which permits the opposite drive wheels to rotate at different speeds while delivering an approximately equal amounts of drive torque to each. Delivering approximately equal amount of torque to the drive wheels independently of the rotational speed sometimes significantly limits the total amount of torque which can be delivered to the drive wheels when one of the drive wheels loses traction. For example, if either drive wheel does not have sufficient traction to sustain its portion of the drive torque, the amount of drive torque which can be delivered to the other drive wheel is similarly reduced.

In an attempt to overcome this problem, there are certain modifications to differential performance which support unequal distributions of torque between the drive wheels. The unequal distributions of torque are supported by resisting any differential rotation between drive wheels. A limited slip differential modifies a conventional differential by including a frictional clutch mechanism which resists any relative rotation between the drive wheels. Unequal torque distribution between drive wheels is supported by sacrificing some of the differential capacity to support unequal rotational speeds between the drive wheels during cornering.

Recently, all wheel drive vehicles have been gaining popularity as a way to enhance traction capability. Instead of dividing drive power between only two wheels of a vehicle either in the front or the rear, all wheel drive vehicles divide power between all four wheels. As a result, each wheel is required to support a smaller portion of the total drive torque. However, in addition to delivering power to both the front and rear drive axle, all wheel drives must also permit the two axles to rotate at different speeds. Accordingly, driveshafts to the front and rear axles are often interconnected by a differential mechanism which permits the front and rear drive axles to rotate at different speeds while delivering approximately equal amounts of torque. Part-time four wheel drive systems permit a vehicle operator to selectively connect a second drive axle to the vehicle driveline when adverse traction conditions are encountered. It should be noted however, that if both front and rear axles are permanently interconnected by a differential mechanism, more power is expended by the drivetrain delivering power to two drive axles in comparison to delivering power to only one of the axles. Thus, adequate traction is available for a single pair of drive wheels to support the delivery of drive power and the further division of drive power among more than two wheels is not necessary. Significant power losses and reduced gas mileage sometimes occur as a result of the unnecessary transmission of drive power to additional wheels.

Part-time four wheel drive systems rely on operator judgment to select between two and four wheel drive modes. Driveshafts to the front and rear drive axles are generally coupled together in the four wheel drive mode, thereby preventing the two axles from rotating at different speeds. The drive wheels of one or the other axles tend to skid in response to courses of travel which require, the front and rear axles to rotate at different speeds. Accordingly, significant power losses occur in the four wheel drive mode from the tendency of one of the axles to brake the vehicle. Power is delivered to either the front or rear axle depending on whichever axle is required to rotate slower to maintain traction. This makes for unpredictable changes in vehicle handling characteristics by switching between effective front or rear wheel drive. Further, part-time four wheel drive vehicles experience the same loss of traction as two wheel drive vehicles until the four wheel drive mode is engaged.

It is also known in the art to provide a conventional differential interconnecting front and rear drive axles with a limited slip differential to further enhance traction capabilities of all wheel drive vehicles. The limited slip differential supports unequal distributions of torque between drive axles, but it also resist relative rotation between the axles. Accordingly, the same power losses occur from permanently driving an additional axle, and drive torque is unpredictably divided between the front and rear axles in response to situations requiring the drive axles to rotate at different speeds.

U.S. Pat. No. 5,782,328 ("the 328 patent"), to Warn Industries, Inc. describes the use of a bi-directional clutch in combination with a transfer case. More specifically, the '328 patent describes a transfer case for a vehicle having two output shafts, a gear reduction assembly, a coupling mechanism and an overrunning roller clutch for selectively producing driving of one shaft only or both shafts concurrently. The coupling mechanism selectively couples one output shaft to either (1) an input shaft, (2) the gear reduction assembly, or (3) a neutral position. The overrunning clutch has an inner race, and outer race, and rollers located between the races. Drag shoes are positioned to frictionally slide on a drag surface of a selectively grounded member to retard the rollers. A resilient band urges the drag shoes against the drag surface. When the drag shoes rotate at a sufficient speed they disengage from the drag surface so as to provide no force to retard the rollers. When the ground member is grounded it provides the drag surface for the drag shoes. When the ground member is ungrounded it is free to rotate and the drag shoes do not provide a drag force to bias the rollers. A latch may be coupled to the inner race to engage a roller cage to prevent high speed lock-up. A drag ring is located inside the outer race and provides a drag force on the rollers to advance the rollers when it is desired, e.g., when front wheel compression braking is advantageous. An actuator assembly is provided with a variable speed drive for shifting the transfer case between modes of operation.

U.S. Pat. No. 5,195,604, also to Warn Industries, Inc., describes a bi-directional clutch for use with a braking system. More specifically, the '604 patent describes a clutch mechanism for a drive train of a four-wheel drive vehicle for controlling the application of braking power between the front and rear wheels as applied through the drive train. A driving shaft is connected to a driven shaft through a roller clutch assembly and the driven shaft is coupled to a wheel set equipped with anti-lock brakes. The driving shaft has a drive cam race and a driven shaft has a cylindrical race. A cage carries the clutch rollers and is provided with drag shoes biased against a fixed drag ring. The rollers captured by the cage continuously drag against the rotative urging of the driving shaft whereby the rollers engage the cylindrical race with the driving shaft inducing driving rotation of the driven shaft, and disengage with the driving shaft inducing braking rotation of the driven shaft.

U.S. Pat. No. 4,605,087 to Volkswagenwerk Aktiengesellschaft discloses an all wheel drive system wherein the wheels of only one axle are driven continuously, while the drive for the other wheels of the second axle can be obtained automatically by means of a viscosity clutch in the driving train between the front axle and the rear axle so that the front and rear axles are coupled with each other, essentially rigidly according to the torque. U.S. Pat. No. 4,605,087 discloses a device constituting an overrunning device which is automatically coupled and uncoupled according to the direction of the torque, e.g., such as a grip roller overrunning device. According to the invention, because of the presence of the overrunning device in the otherwise all wheel drive system, the possibility of locking of the front wheels could cause locking of the rear wheels and through the driving train is eliminated because the overrunning device automatically interrupts transmission of the torque in this direction through the drivetrain.

BRIEF SUMMARY OF THE INVENTION

It is an object of the present invention to provide an all wheel drive system which improves vehicle traction and handling during adverse driving conditions.

It is an object of the present invention to provide an all wheel drive system which incorporates a speed sensing torque transfer system which senses speed difference between the front differential and rear differential and transfers torque upon such speed difference.

It is an object of the present invention to provide an all wheel drive system which senses speed difference between the front wheels and rear wheels and transfer torque upon such speed difference.

It is a further object of the present invention to provide an all wheel drive system which is under normal operating conditions an all wheel drive system (AWD) which operates with generally 100% torque to the front wheel drive system and if the front wheels begin to slip the front differential rotates at a higher speed than the rear differential consequently with the power take-off unit and the front propshaft causing the rear propshaft to rotate at a higher speed such that the speed sensing torque transfer device senses the speed difference between the inputs of the rear propshaft and the rear differential and engages whereby the speed sensing torque transfer device transmits torque to the rear differential and wheels until the slip condition at the front wheels is resolved and all wheels are thereby rotating at the same speed.

It is a further object of the present invention to provide an unsymmetrical torque arm for use in conjunction with the speed sensing torque transfer system and rear differential to support the rear differential.

It is yet a further object of the present invention to provide a torque arm module including a torque arm which is capable of shielding the speed sensing torque transfer system and rear differential rear propshaft from excessive heat radiated by the exhaust system of the motor vehicle.

It is yet a further object of the present invention to provide a speed sensing torque transfer system which allows for overrunning of the rear axle pinion relative to the front axle pinion without transfer of torque in both forward and reverse directions.

It is yet another object of the present invention to provide a speed sensing torque transfer system which allows for tuning of the driveline system to accommodate torque transfer to the rear wheels as required during conditions of front wheel slip without transmission of nominal driving torques when driving on high $\mu$ surfaces where AWD is not required.

It is another object of the present invention to provide an all wheel drive system including a speed sensing torque transfer system which compensates for tire size variation, tire wear and spare tire or spare wheel usage.

It is yet still a further object of the present invention to provide an all wheel drive system including a viscous coupling, bi-directional clutch, and a rear differential having a gear ratio greater than the power take-off gear ratio.

It is yet a further object of the present invention to provide an all wheel drive system including a viscous coupling and a bi-directional clutch whereby the viscous coupling also acts to dampen the engagement of the bi-directional clutch by reducing the amount of instantaneous transfer of torque.

It is yet another object of the present invention to provide an all wheel drive system including a torque arm mount with an asymmetric configuration which is attached to the front face of the rear differential housing and the motor vehicle undercarriage to reduce the torque reaction load of the rear differential.

It is still a further object of the present invention to provide an all wheel drive system having an asymmetrical torque arm layout which provides improved packaging flexibility and reduced packaging requirements and further acts as a heat shield between the exhaust system and the temperature sensitive driveline components.

It is yet still a further object of the present invention to provide an all wheel drive system having a bi-directional clutch connected operationally to a viscous coupling and rear differential with a gear ratio that is greater than the gear ratio of the front differential, allowing the rear wheels to overrun the front wheels.

BEST MODE FOR CARRYING OUT THE INVENTION

Figure 1:
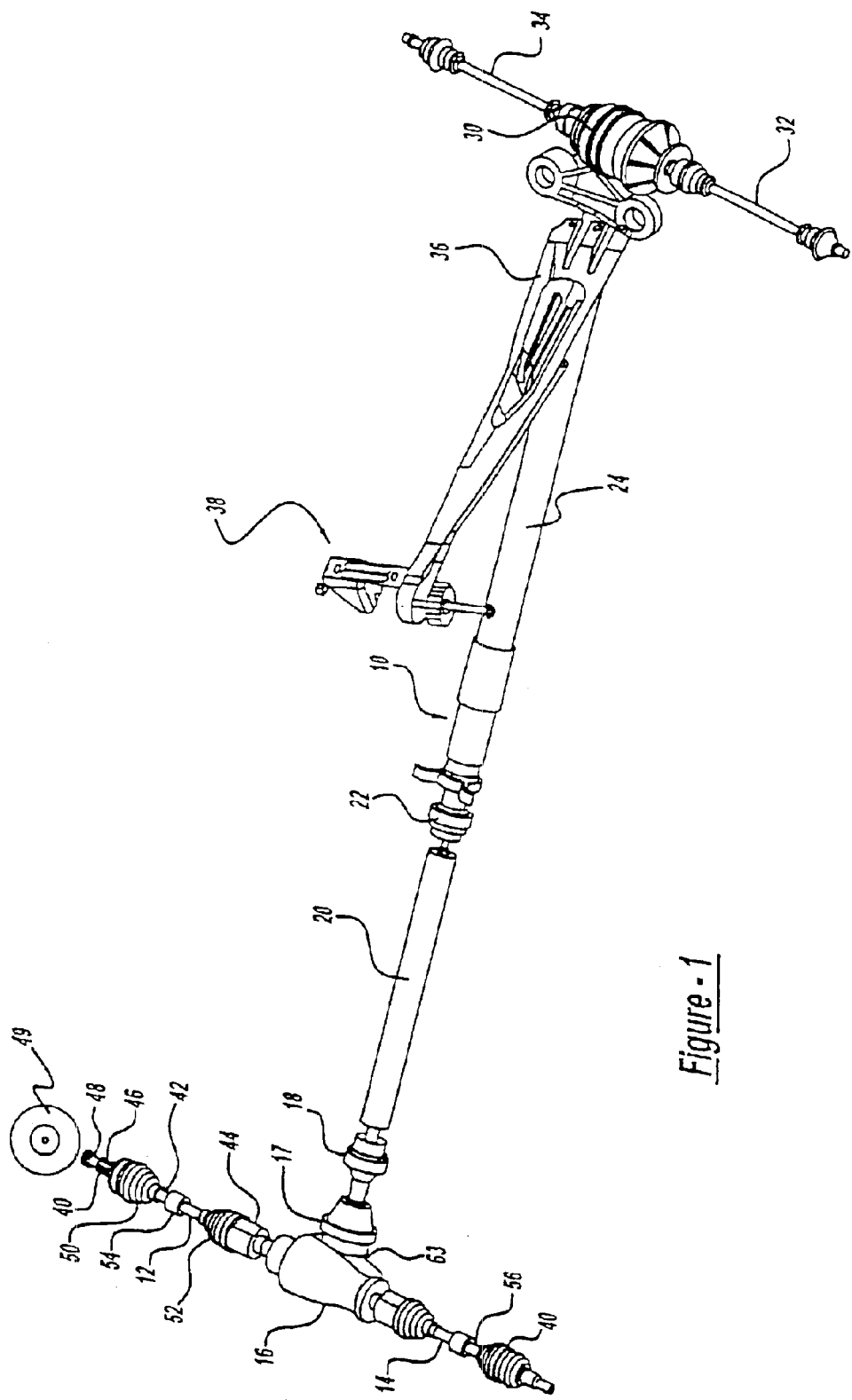
FIG. 1 is a partially exploded, perspective view of an all wheel drive system of the present invention.

Referring to FIG. 1 there is shown generally by reference numeral 10 the all wheel drive system of the present invention. The all wheel drive system comprises a pair of front halfshaft assemblies designated as reference numerals 12 and 14 respectively. The front halfshaft assemblies 12 and 14 are operatively connected to a front differential 16. Connected to front differential 16 is a power take-off unit 17. The power take-off unit 17 is operatively connected to a high speed fixed joint 18. Operatively connected to high speed fixed joint 18 is a front propshaft assembly 20. Operatively connected to front propshaft assembly 20 is a cross groove or "VL" style plunging constant velocity joint designated as reference numeral 22. Connected to cross groove plunging constant velocity joint 22 is rear propshaft assembly 24.

Figure 2:
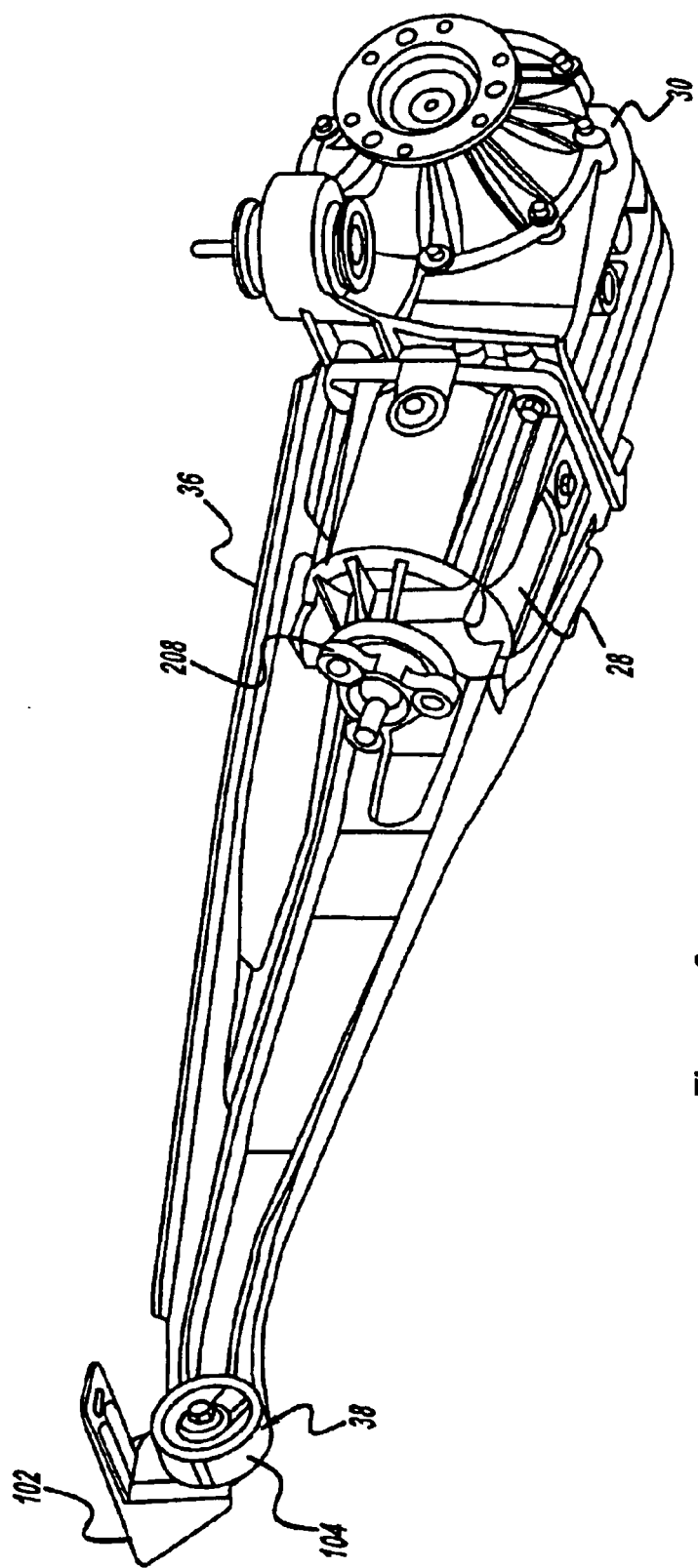
FIG. 2 is a perspective view of a differential, speed sensing torque transfer device, and one embodiment of a torque arm module of the present invention.
Figure 3:
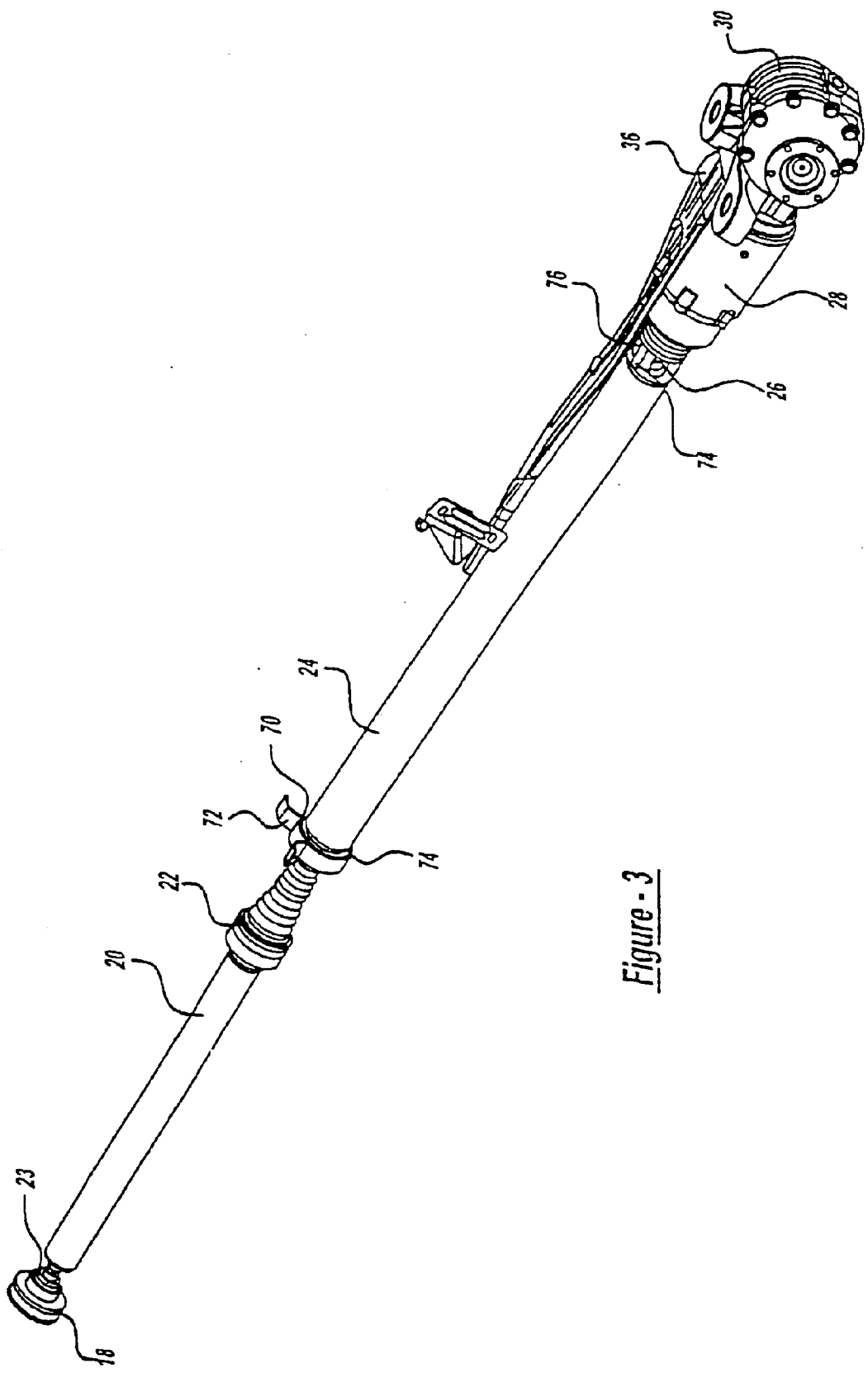
FIG. 3 is a perspective view of a differential, speed sensing torque transfer device, torque arm module, rear propshaft assembly, center bearing assembly, plunging constant velocity joint, front propshaft assembly and high speed constant velocity joint of the present invention.
Figure 10:
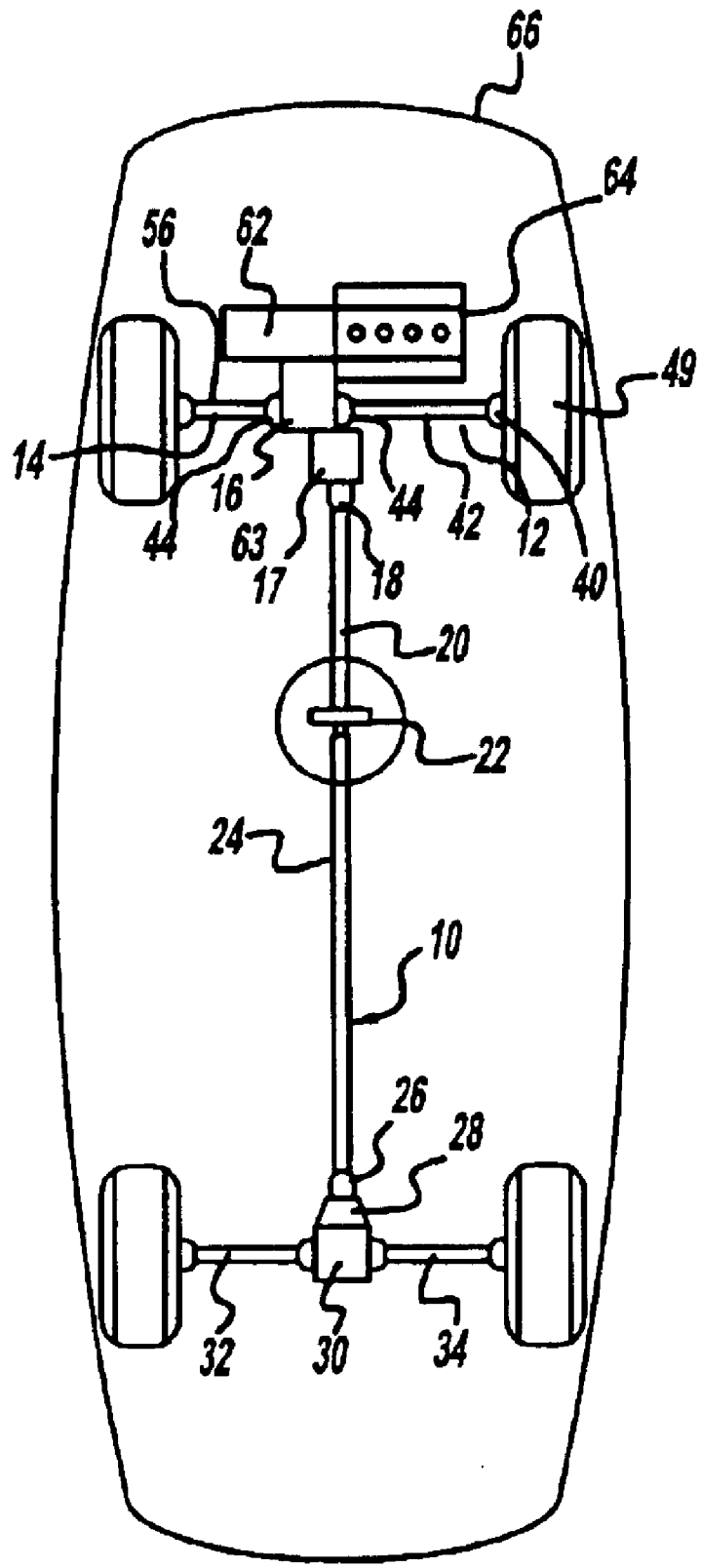
FIG. 10 is a diagrammatical depiction of the all wheel drive system of the present invention.

Referring to FIG. 10, rear propshaft assembly 24 is connected at one end to cardan joint assembly 26. Cardan joint assembly 26 is operatively connected to the speed sensing torque transfer device of the present invention designated as reference numeral 28. Speed sensing torque transfer device 28 is operatively connected to rear differential assembly 30. A pair of rear halfshaft assemblies 32 and 34 are each connected to rear differential assembly 30. As shown in FIGS. 1, 2 and 3, attached to the rear differential assembly 30 is torque arm 36. Torque arm 36 is further connected to torque arm mounting assembly 38.

As shown in FIG. 1, front halfshaft assemblies 12 and 14 are comprised of fixed constant velocity joints 40, a interconnecting shaft 42 and a plunge style constant velocity joint 44. Plunge style constant velocity joint 44 are operatively connected to the front differential 16. Plunge style constant velocity joints 44 are plug-in style in this embodiment. It is contemplated in the present invention that any style of constant velocity joint halfshaft assembly could be used in the present invention as it relates to different types and styles of constant velocity joints such as plunging or tripod style constant velocity joints, angular articulation or AAR constant velocity joints and other various types of fixed constant velocity joints. As is shown in FIG. 1, the stem portion 46 is splined such that it interacts with a front wheel of a motor vehicle and has a threaded portion 48 which allows connection of the wheel 49 to the halfshaft assembly 12. Wheel 49 is also shown in FIG. 10.

There is also shown in FIG. 1 constant velocity joint boots 50 and 52 which are known in the art and are utilized to contain constant velocity joint grease which is utilized to lubricate the constant velocity joints. There is also shown a dynamic damper 54 which is known in the art. U.S. Pat. No. 5,660,256 to the assignee of the present invention is herein incorporated by reference and utilized for specific details with respect to design and operation of dynamic dampers. Halfshaft assembly 14, according to the present invention, would be designed generally similar to that of halfshaft assembly 12 with the only changes being the length of the interconnecting shaft 56. It is also known to utilize different sizes and types of constant velocity joints on the left or right side of the drive system depending on the particular application.

Referring to FIG. 10, the power take-off unit 17 is mounted to the face of the transmission 62 and receives torque from the front differential 16. The transmission 62 is operatively connected to the engine 64 of the motor vehicle 66. The power take-off unit 17 has an offset or the same gear ratio as the front differential 16. The power take off unit 17 drives the front propshaft 20 through the high speed fixed joint 18 at 90 degrees from the front differential axis.

Figure 12:
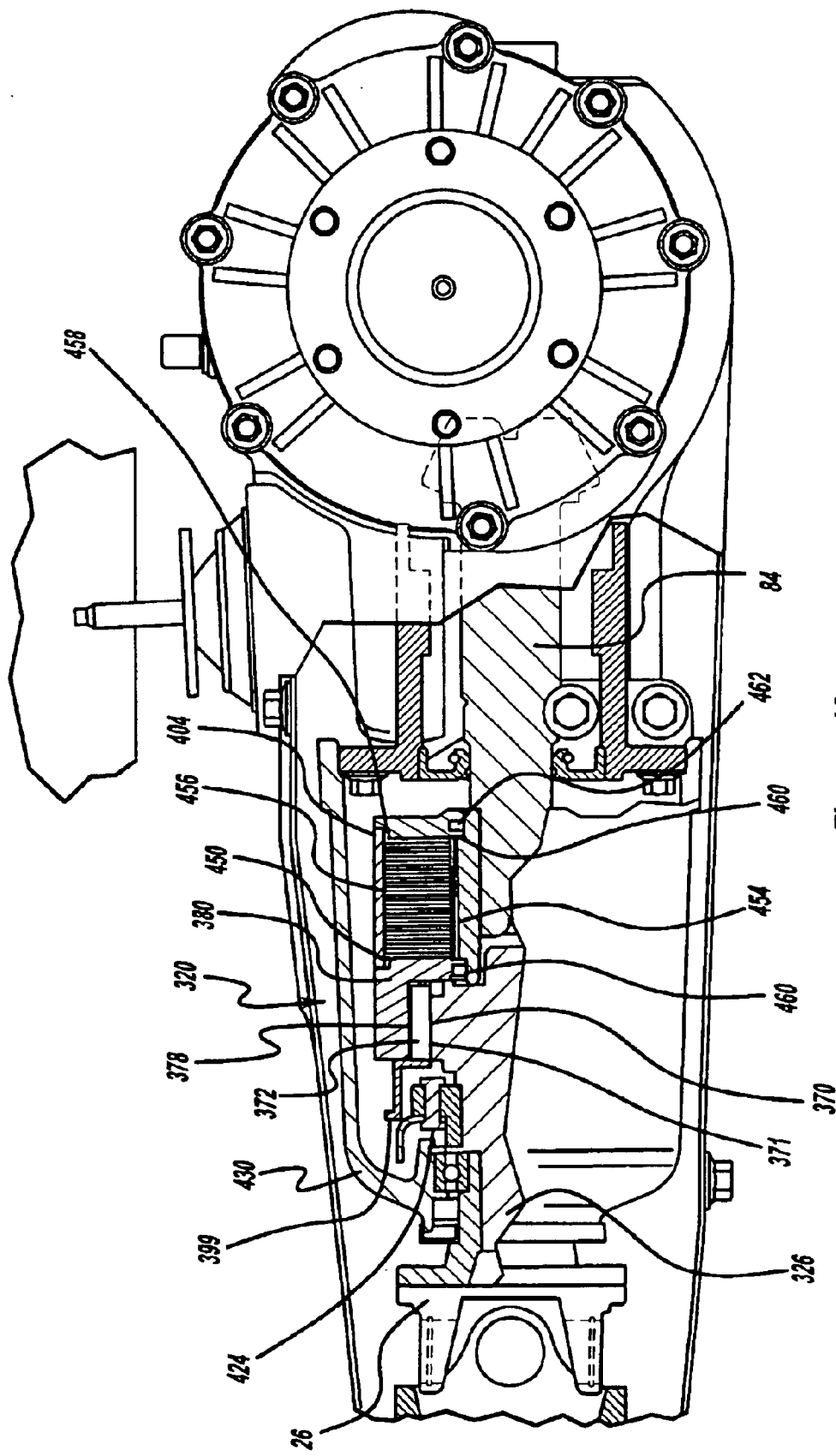
FIG. 12 is a partially cross sectional view of the cardan joint, speed sensing torque transfer device and differential of the present invention.

As shown in FIG. 12, the roller clutch 320, has an inner race 370 and outer race 378 with rollers 372 located between the inner and outer races 370 and 378. Inner race 370 has a plurality of cam surfaces 371 shown in FIG. 34 for engaging the rollers 372. When the inner race 370 rotates faster than the outer race 378, the rollers 372 jam, or lock on the outer race 378, thus engaging the clutch 320 to transfer torque.

In the bi-directional overrunning clutch of the present invention, the rollers 372 are biased into a retarded position, that is biased opposite the direction of rotation, by a drag member 424. This allows the outer race 378 to overrun the inner race 370 without locking the rollers 372 on the cam surface 371. However, when the inner race 370 begins to overrun the outer race 378, the rollers 372 quickly engage and torque from the inner race 370 is transferred to the outer race 378. From the outer race 378 torque is transmitted to the viscous coupling 404 and eventually to the rear differential 30 upon an adequate speed difference.

Having described some of the general characteristics of the all wheel drive system, attention will now be turned to the specific elements of the system.

In the current all wheel drive system, an internal combustion engine 64 is operatively connected to a front wheel drive transmission system 62 shown in FIG. 10. As can be seen from FIG. 10, front halfshaft assemblies 12 and 14 are operatively connected to transmission system 62. More specifically, transmission system 62 includes a front differential 16 as is known in the art, which includes some means for receiving the plunging constant velocity joints 44 of the front halfshaft assemblies. Internal to the transmission 62, the front differential housing 63 is operatively connected to the power take-off unit 17 shown in FIG. 10. The power take-off unit 17 is further connected to a high speed fixed joint 18.

As seen in FIGS. 1 and 10, high speed fixed joint 18 is connected at one end to the power take-off unit 17 and at the other end to a front propshaft 20. The high speed fixed joint has an revolution-per-minute (RPM) capacity of 6000 RPMs with a best mode of 3000–5000 RPMs, a torque capacity of 5–1500 Nm with a best mode of 600–700 Nm, and an angle capacity of up to 15 degrees with a best mode of 3–6 degrees. The present invention contemplates use of other constant velocity joints and/or cardan joints or universal joint technology at this connection but the preferred embodiment of the present invention is a high speed fixed joint as described above. As shown in FIG. 3, high speed fixed joint 18 includes a boot 23 which is utilized to enclose grease (not shown) required for lubrication of the high speed fixed joint 18.

Figure 4:
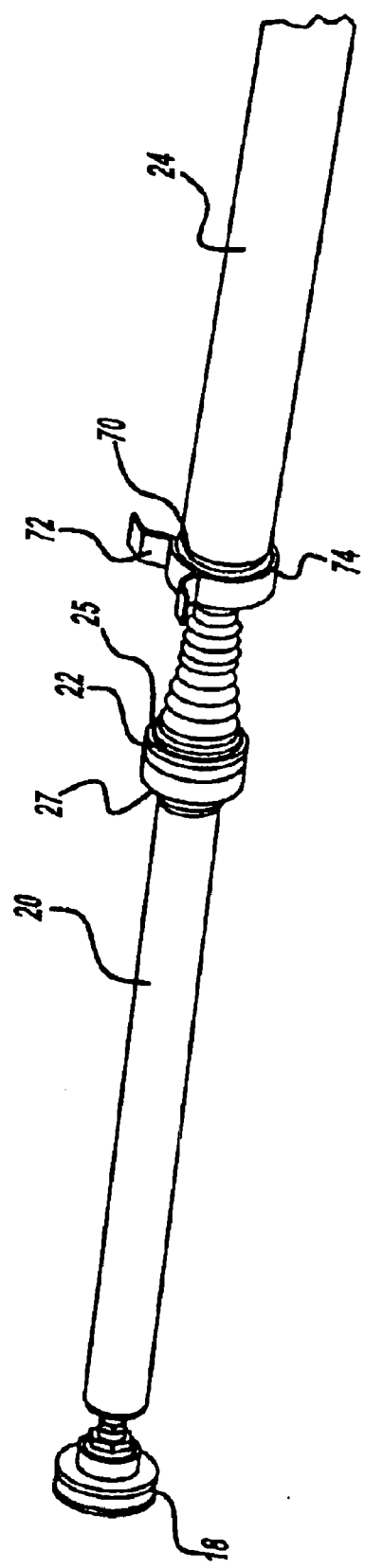
FIG. 4 is a perspective view of the rear propshaft assembly, center bearing assembly, plunging constant velocity joint, front propshaft assembly and high speed constant velocity joint of the present invention.
Figure 18:
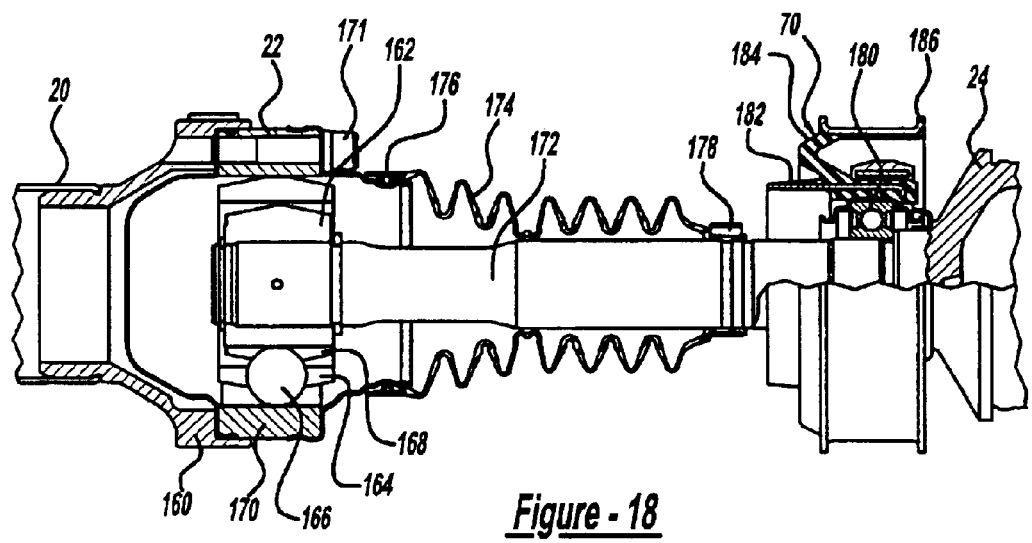
FIG. 18 is an enlarged partially cross sectional view of the plunging style VL constant velocity joint, center bearing assembly and rear propshaft.
Figure 28:
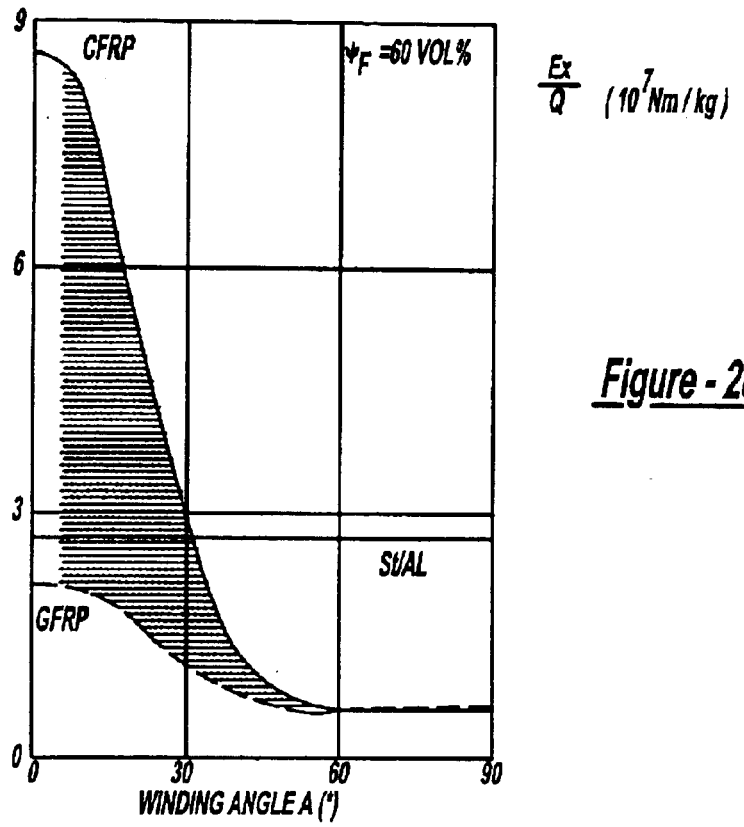
FIG. 28 is a graph depicting winding angle versus youngs modulus.
Figure 29:
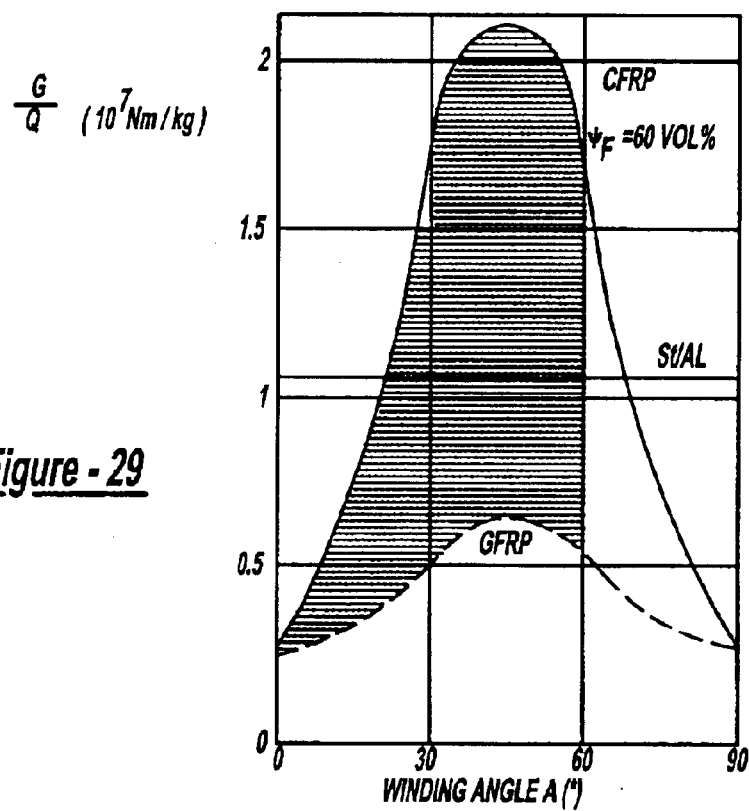
FIG. 29 is a graph depicting winding angle versus g-modulus.
Figure 30:
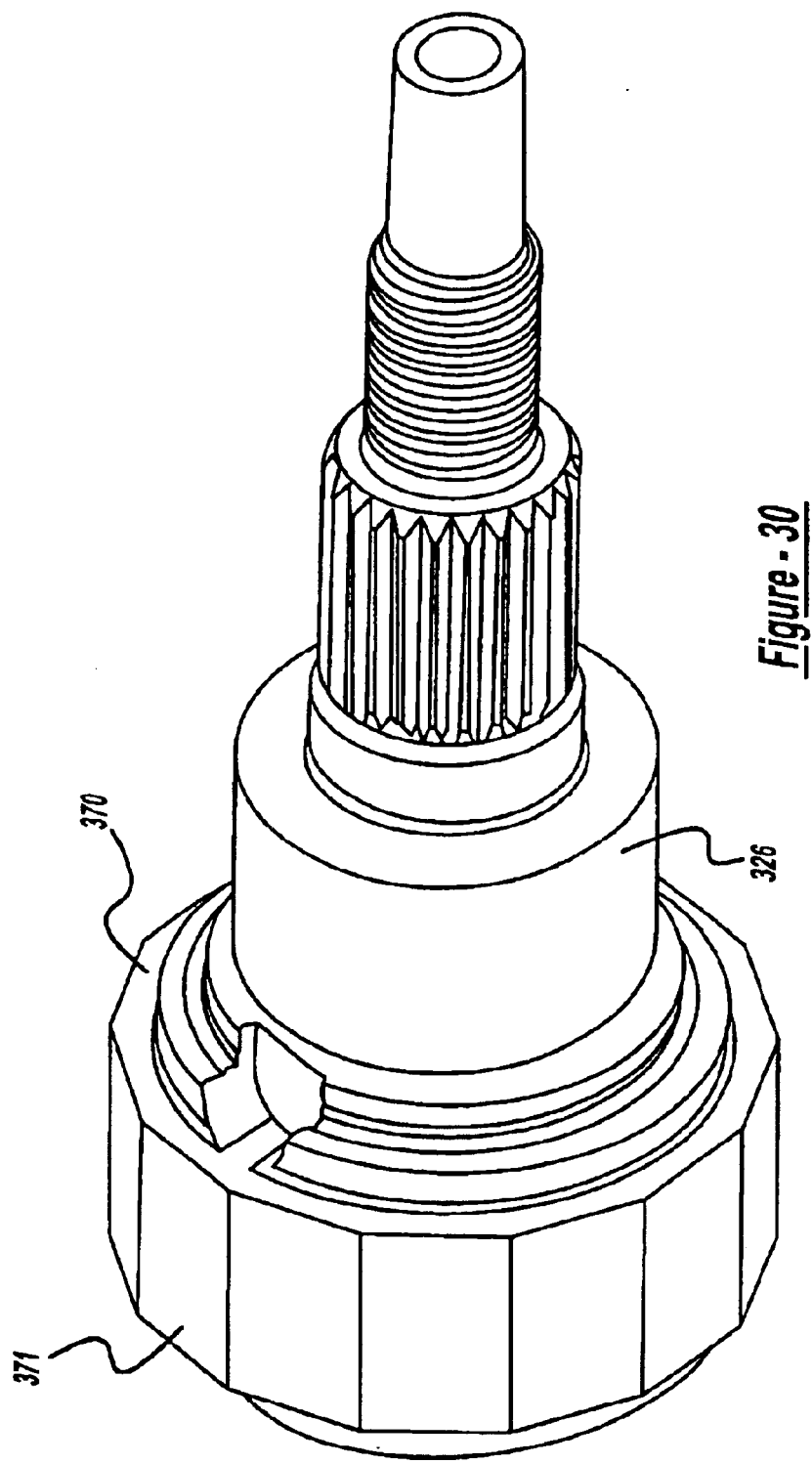
FIG. 30 is a perspective view of the input member of the present invention.
Figure 31:
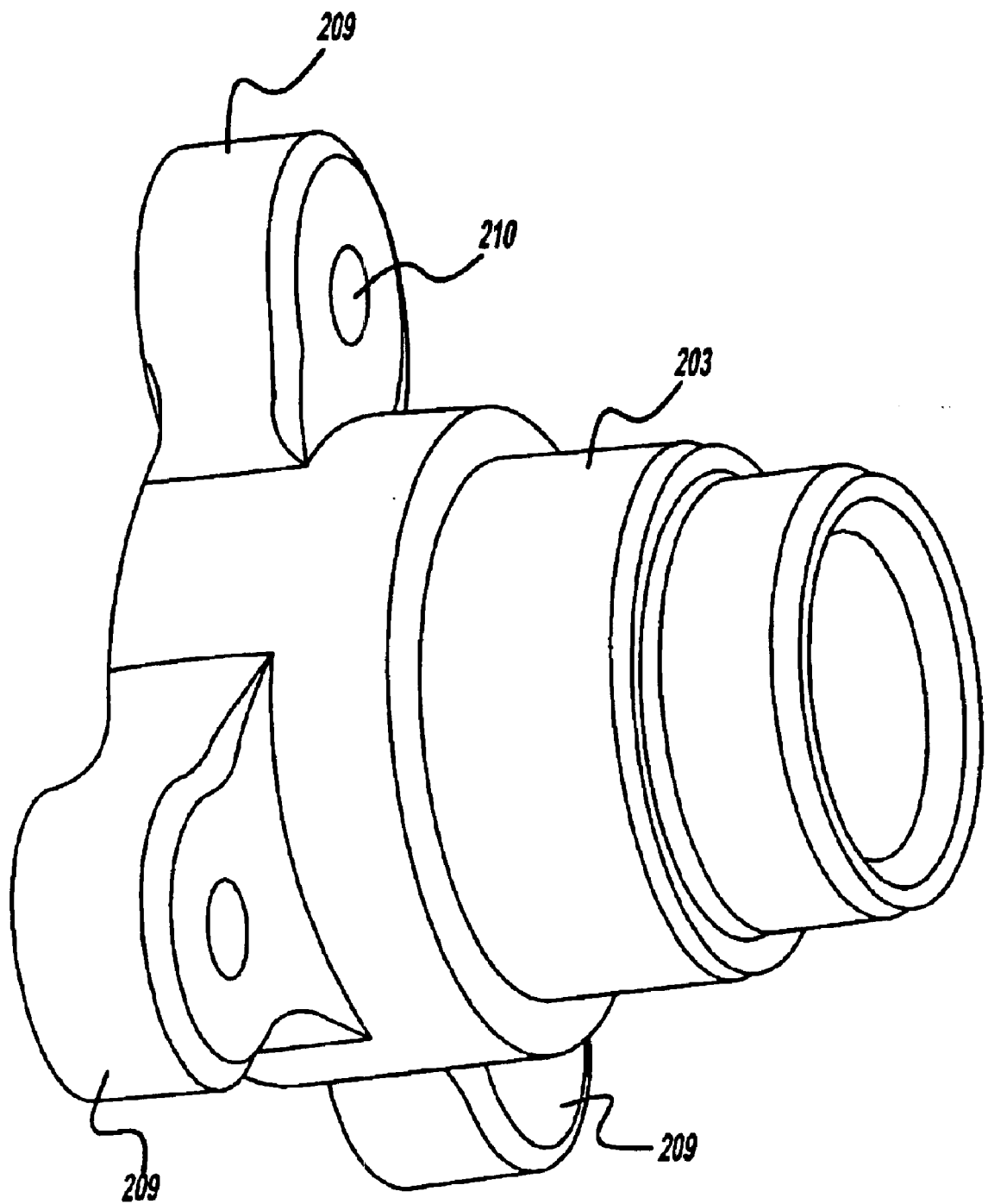
FIG. 31 is a perspective view of a flange of the present invention.
Figure 32:
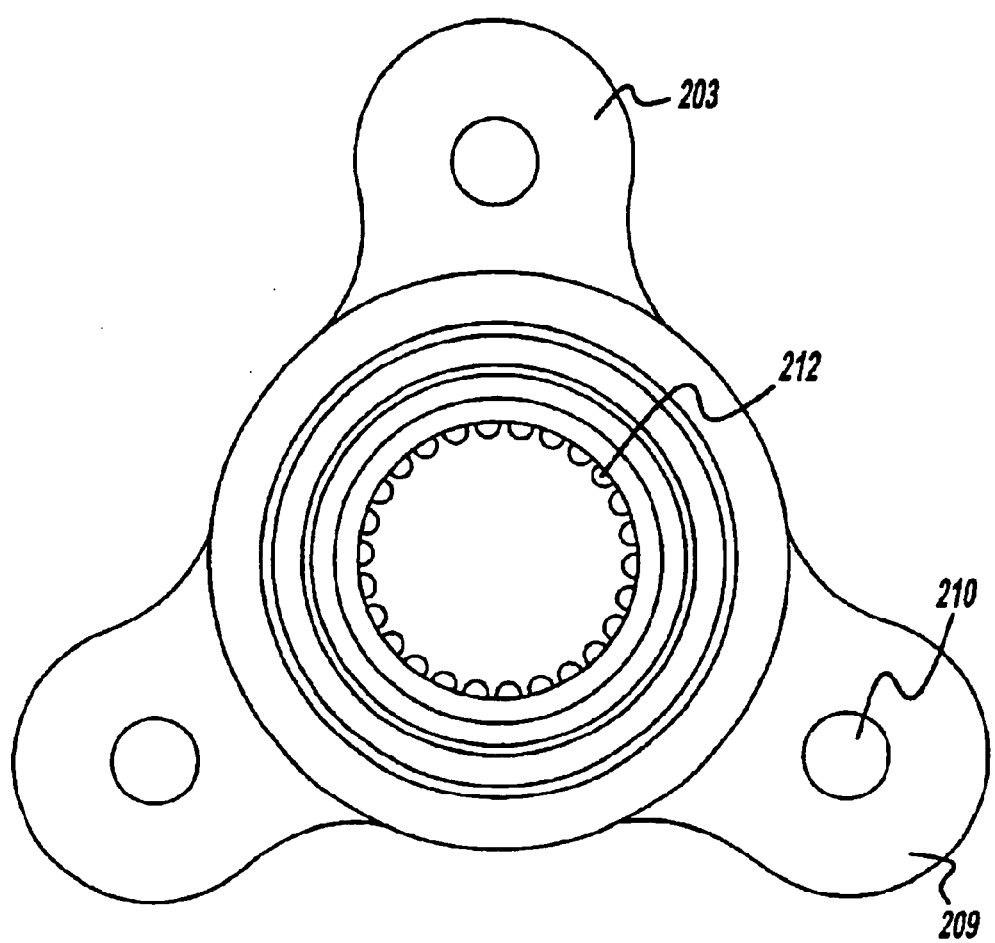
FIG. 32 is a top view of a flange of the present invention.

As shown in FIGS. 3 and 4, the front propshaft 20 in the present invention is manufactured from steel providing a very low run-out and critical speed capacity higher than the second engine order. Front propshaft 20 is operatively connected to constant velocity joint 22 by fasteners 25 as in FIG. 4. Front propshaft 20 has a flange 27 extending out which is connected to constant velocity joint 22 by fasteners 25. It is again contemplated by the present invention that this constant velocity joint could be of various types but a constant velocity joint providing a torque characteristic of 6000 RPMs, with a best mode of 3000–5000 RPMs, a torque capacity in a range of 5–1500 Nm, with a best mode of 600–700 Nm, an angle characteristic in a range of 6–10 degrees and a best mode of 8 degrees. An amount of plunge capacity is also required in a range from 0 to 60 millimeters with a best mode of 40 to 55 millimeters. It is the preferred embodiment of the present invention to use a cross groove plunging constant velocity joint as shown in FIGS. 3 and 4. The cross groove constant velocity joint is shown in FIG. 18. Rear propshaft 24 may be manufactured from a composite materia,l generally carbon re-enforced plastic material with a thermosetting epoxy matrix (Bisphenol A) or from steel. As shown in the attached diagram, the rear propshaft of the present invention should have a torsional characteristic related to g-modulus and youngs modulus in the x direction as the function of the winding angle as shown in FIGS. 28 and 29. The present invention contemplates an Ex/q ratio in a range greater than steel and aluminum and preferably greater than 3 as shown in FIG. 28 as the darkened shaded area under the curve. Referring to FIG. 28, Ex equals the longitudinal stiffness of the rear propshaft. Longitudinal stiffness is derived by dividing the load in newtons over the cross sectional area in square meters of the propshaft multiplied by the change in length of the propshaft while the propshaft is under load.

$$Ex = \frac{Load(newtons)}{Area(meters^2)} \Delta L$$

The change in L equals the length final (LF) minus the length initial (LI) divided by the length initial (LI).

$$\Delta L = \frac{LF - LI}{LI}$$

Specifically, pulling on either end of the propshaft will provide a deflection of a certain amount. LF is the length of the propshaft under load. LI is the initial length of the propshaft with the change in L being the difference between LF and LI.

Referring back to FIG. 28, q represents density. Density is measured in kilograms per meter cubed or $K/M^3$.

$$q = \frac{K}{M^3}$$

The ratio Ex/q then determines the longitudinal stiffness of a particular propshaft over its density. With respect to steel and aluminum, it would be noted that it provides a relatively high longitudinal stiffness but also has a very high density thereby providing a lower ratio.

In FIG. 28, CFRP represents a carbon fiber reinforced propshaft. GFRP represents a glass fiber reinforced propshaft. 60% volume represents the percentage fibers by volume. 60% on the graph represents a certain percentage of the propshaft that is fiber and a certain percentage that is a resin. 60% volume represents 60% fiber per unit volume with 40% resin as the other portion per unit volume. Under current manufacturing standards 60% fiber by volume is the best ratio available.

Rear propshaft 24 of the present invention is currently 25% glass and 75% carbon. FIG. 29 is essentially similar to the FIG. 28 except G represents torsional stiffness. Winding angles on the graphs represent, in the X-direction the fibers having a zero angle if they are parallel to the X axis and having a 90 degree angle if set completely perpendicular to the x axis.

Figure 11:
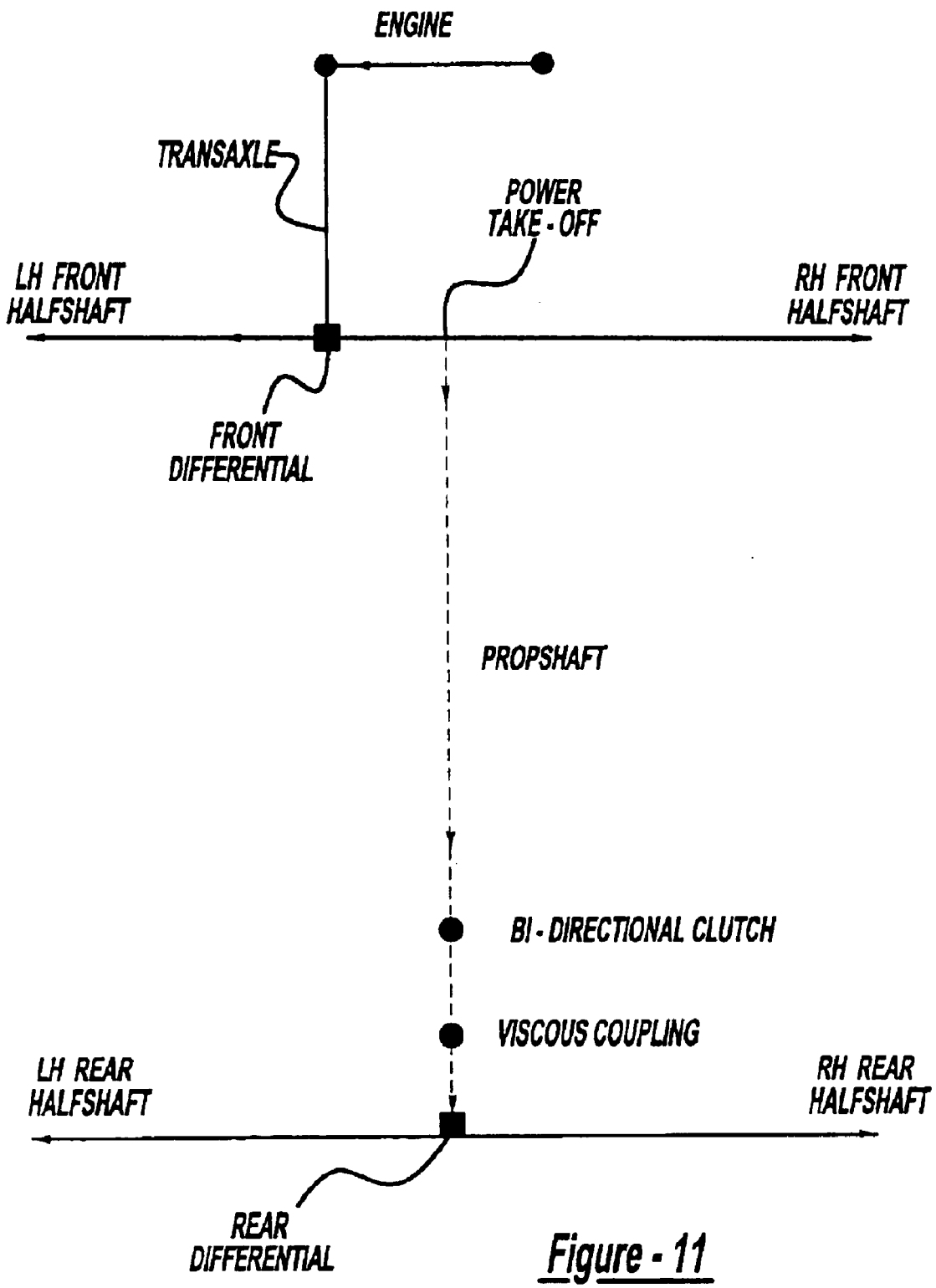
FIG. 11 is a flow chart depicting the torque flow of the all wheel drive system of the present invention.

Referring now to FIGS. 3 and 4 the center bearing assembly 70 is shown supporting the rear propshaft 24 and constant velocity joint 22 connection. Center bearing assembly 70 includes a bracket 72 and a bearing system 74 which is utilized to support the rear propshaft 24 while allowing rotational movement of the rear propshaft 24. It is understood that the center bearing assembly 70 must withstand an RPM of 3000–6000 RPMs while still being able to operatively support the system. Rear propshaft 24 includes a cardan joint 26. Cardan joint 26 connection has a first member 74 which is attached to the rear propshaft and a second connection member 76 which is operatively connected to the speed sensing torque transfer device 28. As shown in FIG. 10 and disclosed diagrammatically in FIG. 11, torque is transmitted from the rear propshaft 24 through the cardan joint 26 and to the internal working components of the speed sensing torque transfer device 28 as previously described.

ROLLER CLUTCH

Figure 22:
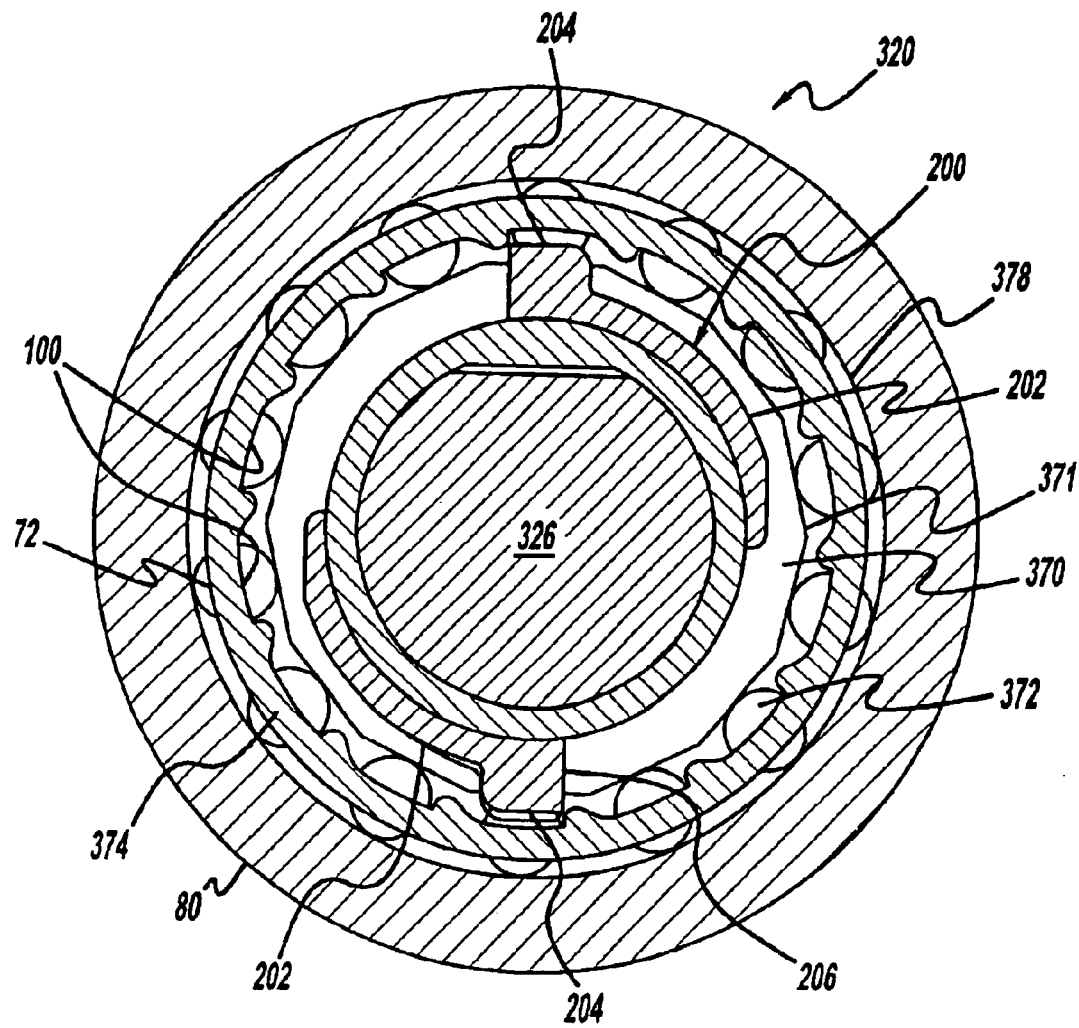
FIG. 22 is a cross sectional view of the bidirectional clutch of the present invention.
Figure 23:
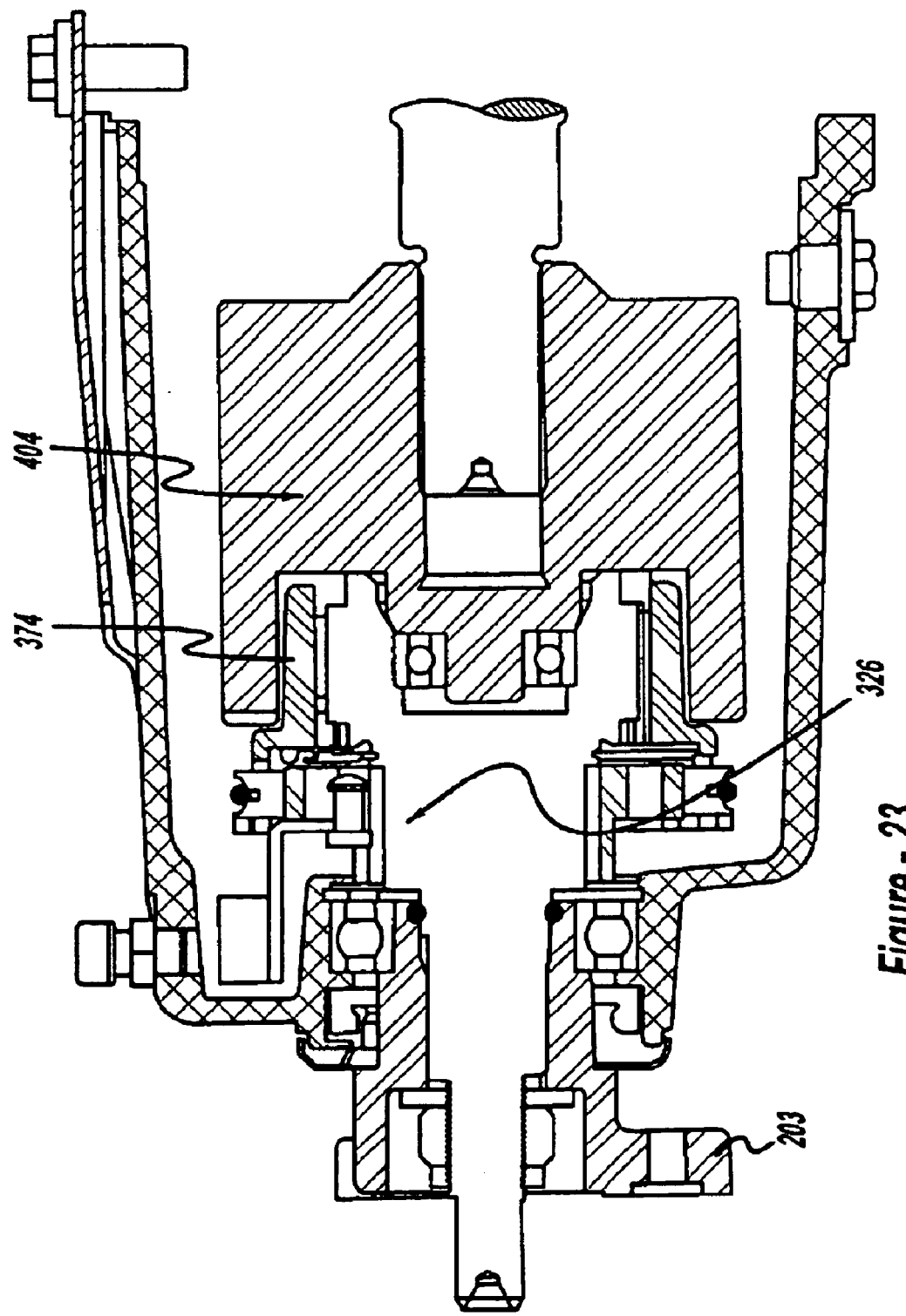
FIG. 23 is a partially cross sectional of the speed sensing torque transfer device of a different embodiment of the present invention.

Referring to FIG. 22, the roller clutch assembly 320 includes an inner race 370 that is formed on, or affixed to, a portion of a surface of input shaft 326. As the driving member of the roller clutch, the inner race 370 has a plurality of cam surfaces 371 for engaging a respective number of rollers, 372. Preferably, the cam surfaces are flat, but other configurations may also be suitable.

Figure 24:
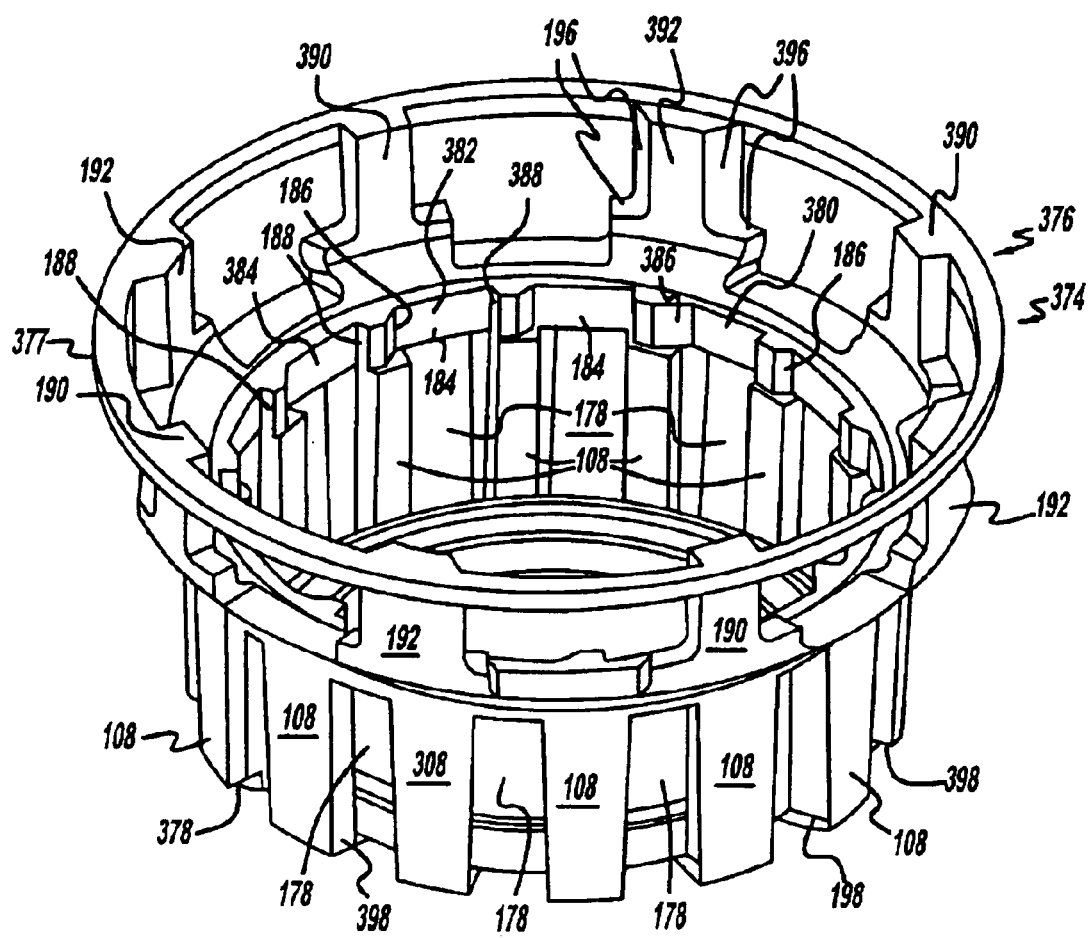
FIG. 24 is a perspective view of the roller cage of the present invention.

Referring to FIG. 24, the rollers 372 are maintained in position by a roller cage 374 that extends circumferentially around the inner race 370 and extends axially outward, forming a skirt 376 having an end ring 377. The roller cage 374 further includes roller openings 378 separated by tangs 308. At one end of the openings 378 and tangs 308 is an index ring 380 that comprises beveled keyways 382.

Preferably, the cage 374 also includes shoe retention legs 390 and shoe separators 392 for retaining and positioning drag shoes 400 as described below and shown in FIG. 25. Referring back to FIG. 24, respective margins 396 of the separators are beveled to assist with shoe retention and positioning. The cage may further be provided with an annular notch 398 for receiving a drag ring 84, described below.

As shown in FIG. 12, outer race 378 is formed along an interior surface of an extension 380 of the outer case 402 of the viscous coupling 404. Preferably, the outer race 378, in this embodiment, is substantially cylindrical, having no cam surfaces thereon. Located radially inward of the outer race 378, and in contact with the outer race 378 and the cage 374, is a drag ring 399. Preferably, the drag ring 399 is a resilient ring located on the roller cage 374 and in contact with the outer race 378. Located adjacent, but outside, the races 370, 378 is all annular friction ground 424 that is journaled on the first input shaft 326. The friction ground 424 includes a plurality of circumferentially located pockets 426 for receiving a locking device as shown in FIG. 25. A suitable material for the friction ground is a metal, such as steel. Located radially outward of the friction ground 424 are a plurality of drag shoes 400 that can press against, and ride on, the friction ground 424. The shoes are coupled to the skirt 376 to be held generally in place and so that drag forces oil the drag shoes are transferred to the rollers 372 by the cage. The drag shoes are substantially semi-circular and extend through an approximate quarter circle arc.

Figure 25:
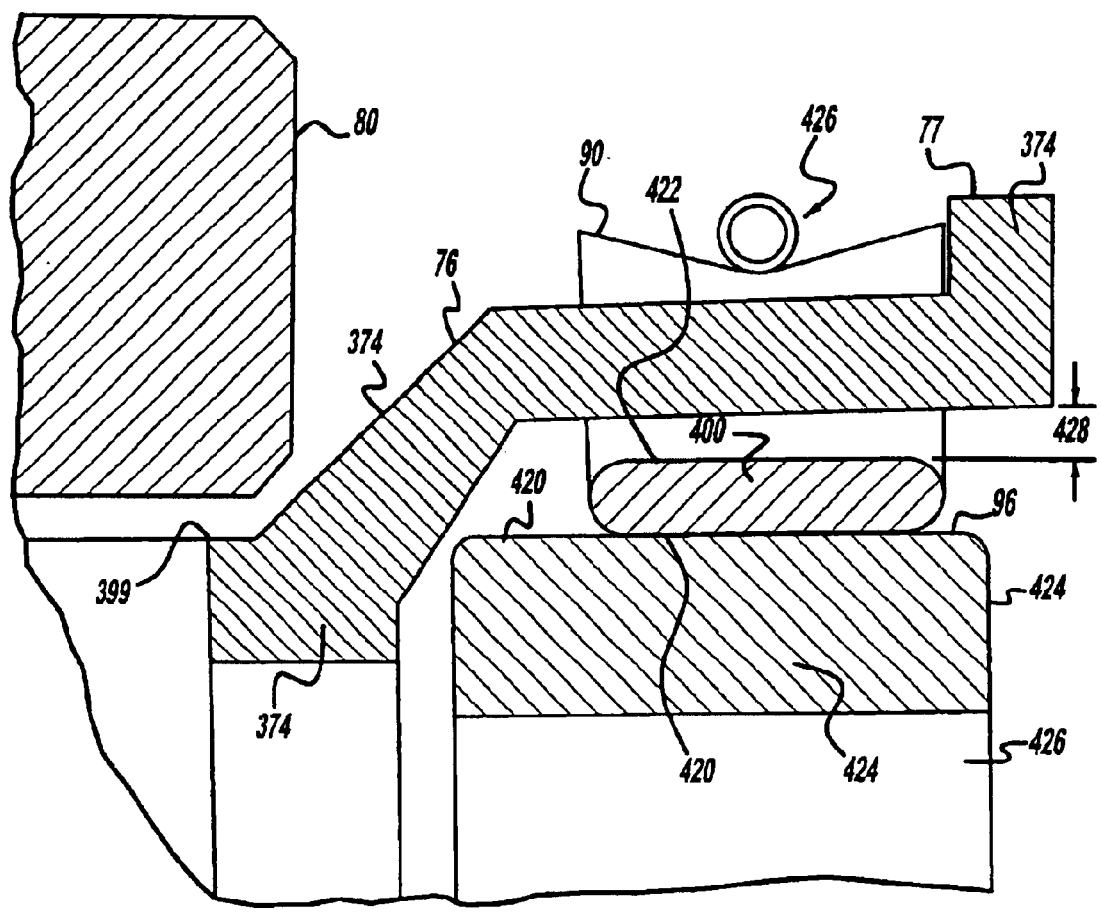
FIG. 25 is a cross sectional view of the clutch mechanism of the present invention.

In cross-section profile as shown in FIG. 25, the drag shoes 400 have a drag surface 420 and upper surface 422. The shoe drag surface 420 slides on the a ground member 424 as described below. The upper surface 422 is positioned radially inward of cage skit 376. Preferably, there are four shoes located circumferentially about the friction ground 424. A suitable material for the drag shoes 400 is carbon-filled polyphenylene sulfide with PTFE.

A garter spring 426 is located about the drag shoes 400 thus urging them radially inwardly against the drag surface 420 of the friction ground 424. As best noted in the detail of FIG. 25, there is a gap 428 between the drag shoes 400 and the skirt 376. This gap allows the drag shoes 400 to be moved away from the friction ground 424 at high RPM, but not to be released totally from the system.

When the friction ground 424 is grounded, that is, held stationary with respect to the housing 430, a drag surface 420 of the friction ground provides the drag surface for the shoes 400. When the shoes ride on the drag surface 420 a drag force is created that is transferred to the roller cage 374. When the first input shaft 326 rotates (and hence the roller clutch and drag shoes are rotated) at a sufficient rotational speed, centrifugal force urges the drag shoes 400 radially outwardly against the radially inwardly directed biasing force of the garter spring 426. At a preselected speed, determined primarily by the mass of the shoes and the force of the garter spring 426, the shoes are urged radially outward away from the drag surface 420 thus reducing or eliminating the drag force. The gap 428 allows such movement.

The friction ground may be selectively grounded. That is, the friction ground 86 may be grounded so that it does not rotate relative to the housing 12, or it may be ungrounded so that it rotates with the input shaft 26. When grounded, the friction ground 86 provides the stationary drag surface 96 upon which the shoes 90 drag to bias the roller cage and rollers 72. When ungrounded, the friction ground rotates with the first input shaft and therefore does not bias the rollers in a retarding direction. For further reference to bi-directional overrunning clutch technology and operation which is known in the art, see U.S. Pat. No. 5,782,328 and U.S. Pat. No. 5,195,604 to Warn Industries, Inc., incorporated herein by reference and described previously.

Referring to FIG. 12, the structure of a viscous coupling 404 is similar to that of a multiple-disc clutch. Inner discs 450 are mounted the inner disc carrier 452. Splines 454 prevent them from rotating around the inner disc carrier 452. Inside of the housing 430 the viscous coupling 404 is provided with splines 456 for the outer discs 458. During assembling of the viscous coupling 404, inner and outer discs 450 and 458 are inserted alternately, so that each effective surface connected on the carrier side is always opposite to one connected on the housing side, and vice versa. The gaps 428 between the discs 450 and 458 are filled with a high-viscosity fluid (not shown), which transmits the torque without the discs being in contact with one another. The working space of the viscous coupling 404 is sealed off from the environment by special-purpose shaft seals 460 and 462.

Figure 26:
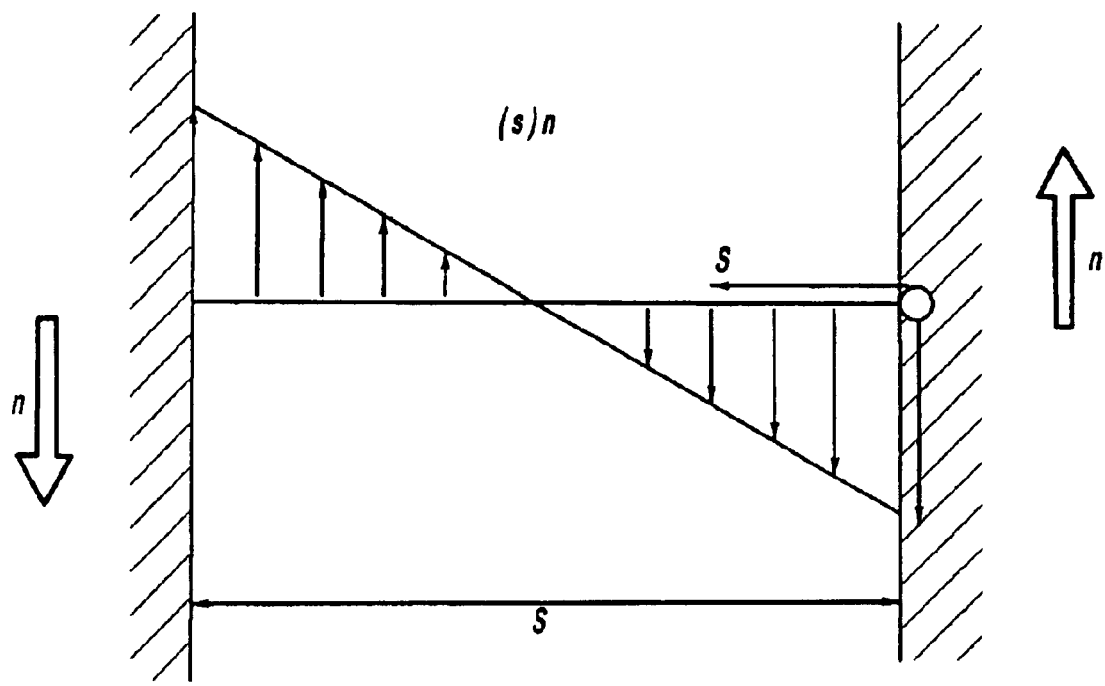
FIG. 26 is a graphical illustration of the shear stress in the gap between the discs of the present invention.
Figure 27:
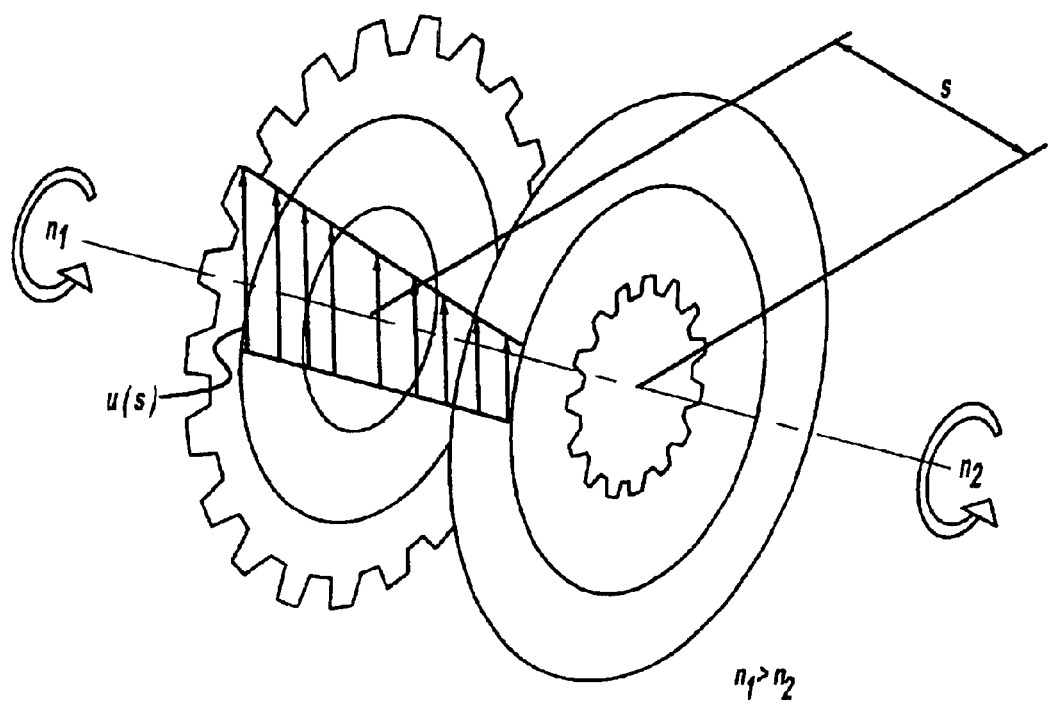
FIG. 27 is a perspective view of one type of inner and outer disc of the present invention.

In operation, torque transmission by the viscous coupling 404 is based on the transmission of shearing forces in fluids. If two surfaces, such as the opposing surfaces of an inner and an outer disc 450 and 458, move relative to one another in a fluid, a shear stress is produced in the fluid filling the gap 428 (shown in FIG. 26). In the viscous coupling 404, this relative motion of the surfaces is achieved through a difference in the speed of rotation of the inner and outer disks 450 and 458 as described in FIG. 27. This difference in the speed of rotation generates the shear stress τ (s) in the gap between the disks as shown in FIG. 26. U.S. Pat. No. 5,791,448, to GKN Viscodrive GmbH, is incorporated herein by reference and provides background for viscous coupling operation.

The combination of bidirectional roller clutch 320 and viscous coupling 404 combine to form the speed sensing torque transfer device 28 of the present invention. The speed sensing torque transfer device 28 has essentially four modes of operation as described below.

Figure 35:
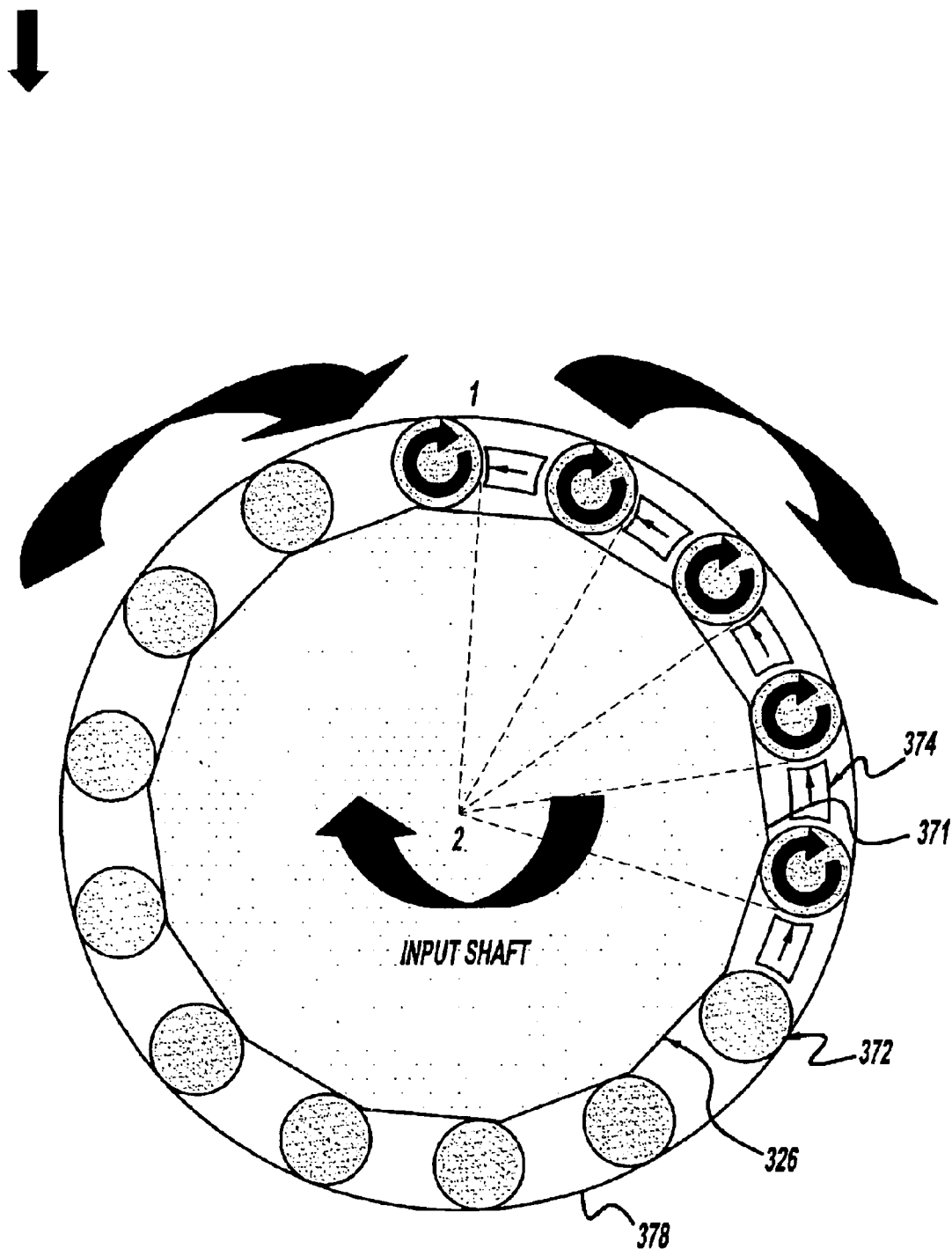
FIG. 35 is a diagrammatical view of the inner race, rollers and outer race of the present invention in an overrun state with no torque transmission.

As shown in FIG. 35, the forward low speed over run mode occurs during low speed operation. Low speed operation is in a range from 0 mph to 35 mph. The brake shoes 400 position the roller cage 374 which positions the rollers 372 to one side of the cam surface 371. The rollers 372 are positioned to the forward side of the cam surface 371 by the friction between the friction ground 424 and the brake shoes 400. In over run the rollers 372 are free to rotate such that no torque is transferred between the inner race 370 and the outer race 378.

In the reverse low speed over run mode (not shown), operation is essentially the same as is the forward low speed over run mode, except the roller cage 374 positions the rollers 372 onto reverse side of cam surface 371 via retardation force provided by the friction between the brake shoes 400 and the friction ground 424.

Figure 34:
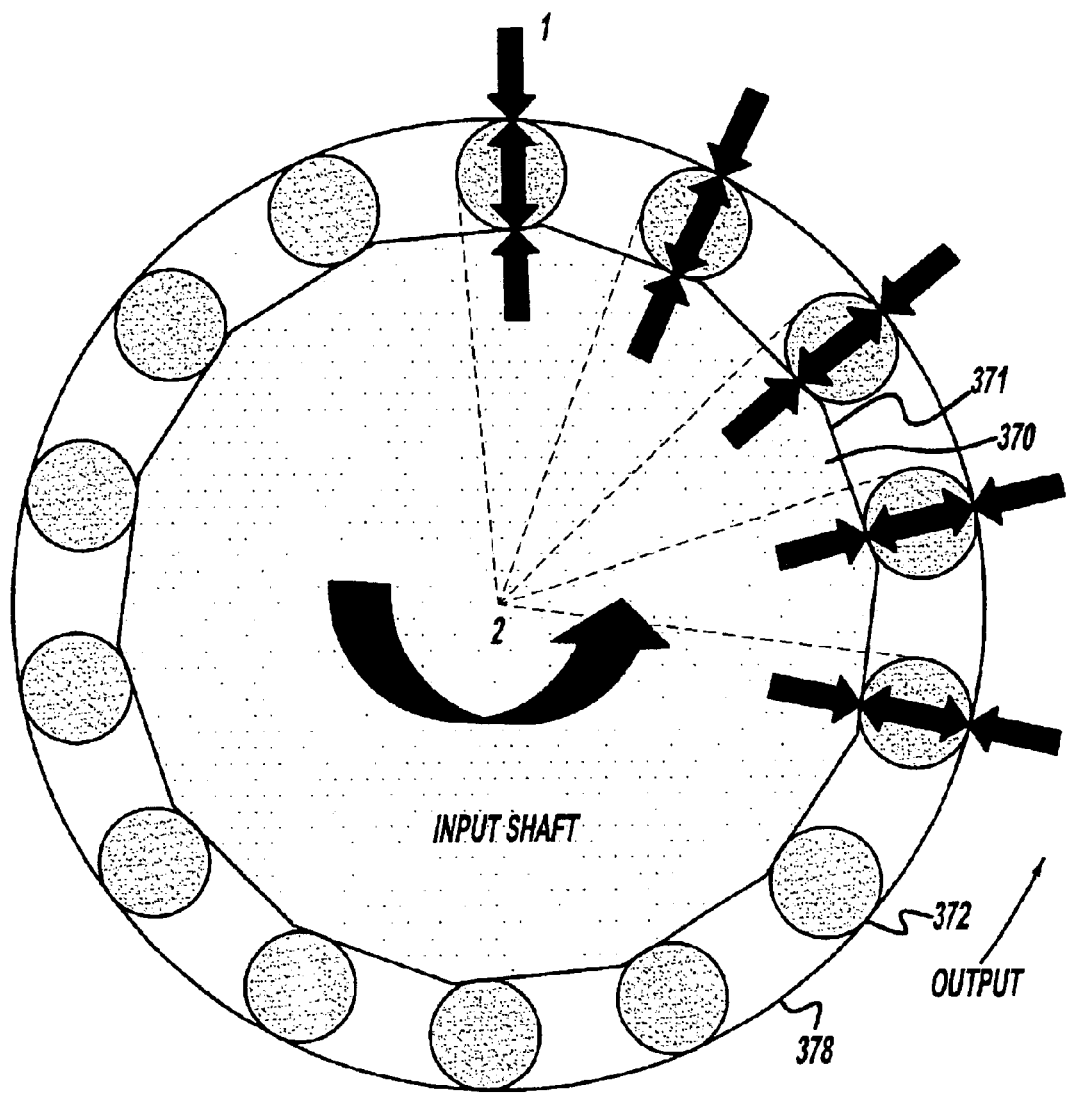
FIG. 34 is a diagrammatical view of the inner race, rollers and outer race of the present invention in a locked state.

In the forward and reverse locked mode as shown in FIG. 34, which occurs during front wheel slip, tight cornering, and any other situation where the inner race 370 spins faster than the outer race 378, the rollers 372 are forced to travel up the cam surface 371 into a locked position. In this mode torque is transferred through the system proportional to the speed differences across the viscous coupling 404.

In the forward high speed latch mode (not shown), which occurs at high speeds during over run, the brake shoes 400 no longer position the rollers 372 on the forward side of the cam surface 371. The brake shoes 400 lift off the friction ground 424 from centrifugal force.

At high speeds the rollers 372 are forced outward onto the outer race 378 due to centrifugal force. This radial force of the rollers 372 forces the rollers 372 to move from the forward side of the cam surface 371 to the reverse side of the cam surface 371 due to the outer race 378 rotating faster than the inner race 370. If the rollers were allowed to travel to the reverse side of the flat during forward over run, the rollers would become pinched and lock the clutch. To overcome the high speed locking issue, a sheet metal latch is used to prevent the rollers from passing the center of the flat during forward high speed. Two slots are machined into the input shaft which correspond to ramps on two sheet metal latches. These latches do not allow the rollers to travel past the center of the flat during high speed operation. The latches are engaged by higher absolute speed which creates high centrifugal force on the latches and overcomes the spring force that retracts the latch at lower speeds.

Referring to FIG. 12, in the locked mode torque is transferred from the cardan joint 26 to the inner race 370. From the inner race 370, torque is transferred to the rollers 372 and then from the rollers to the outer case 402. The outer case 402 has splines 456 as discussed previously. Torque travels from the outer case 402 through splines 456 to the outer disc 458. During the requisite speed differential between the inner and outer discs 450 and 458, torque travels through to the inner disc carrier 452 and then to the pinion gear 84. As described when the front wheels are spinning faster than the rear, the speed sensing torque transfer device 28 senses the speed differential, torque is transferred from the cardan joint 26 to the bidirectional clutch 320 through the viscous coupling 404 to the rear differential 30 and finally out to rear halfshaft assemblies 32 and 34.

Figure 13A:
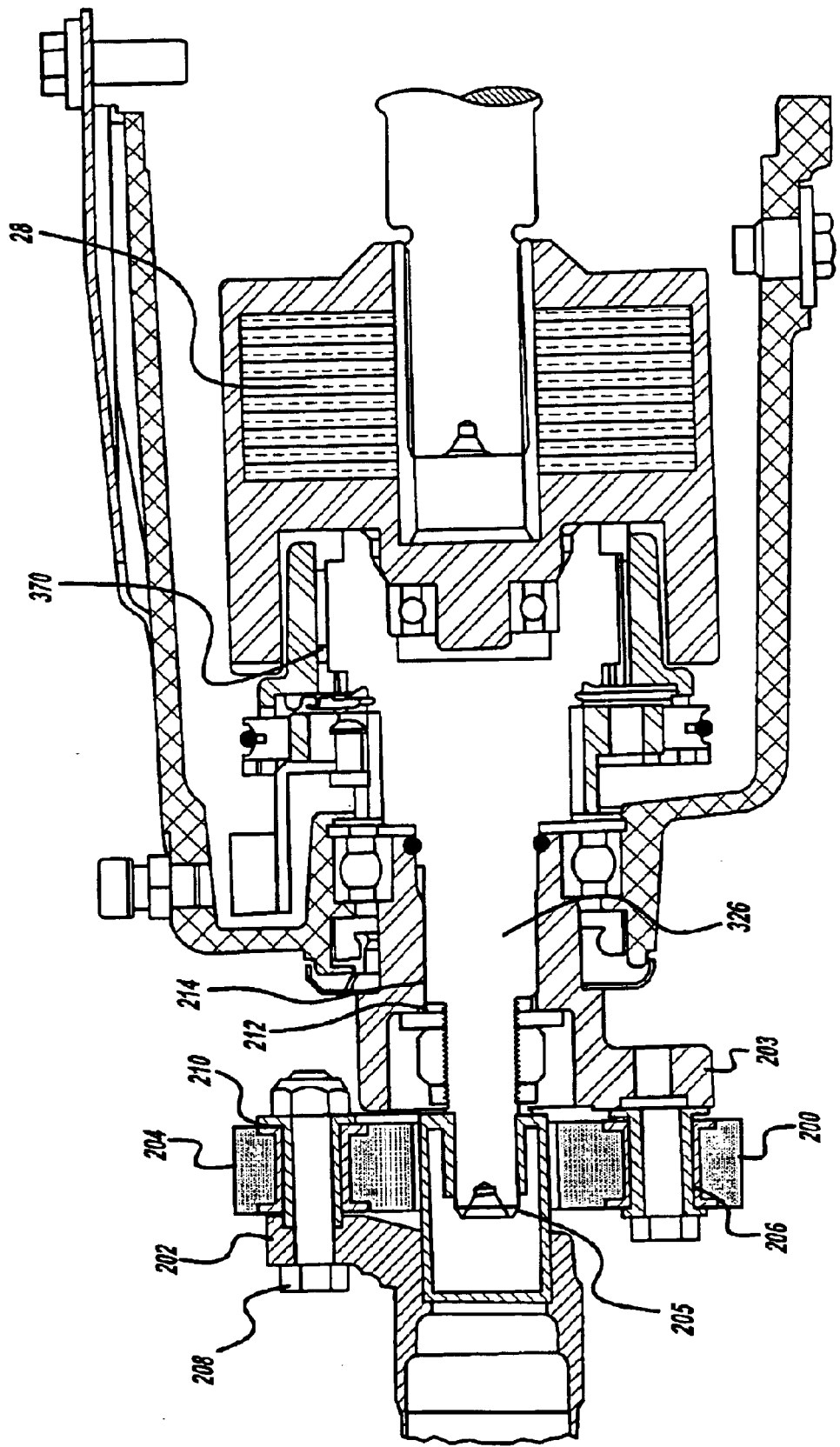
FIG. 13a is a partial cross sectional view of a flexible coupling, speed sensing torque transfer device and differential of an alternative embodiment of the present invention.
Figure 13B:
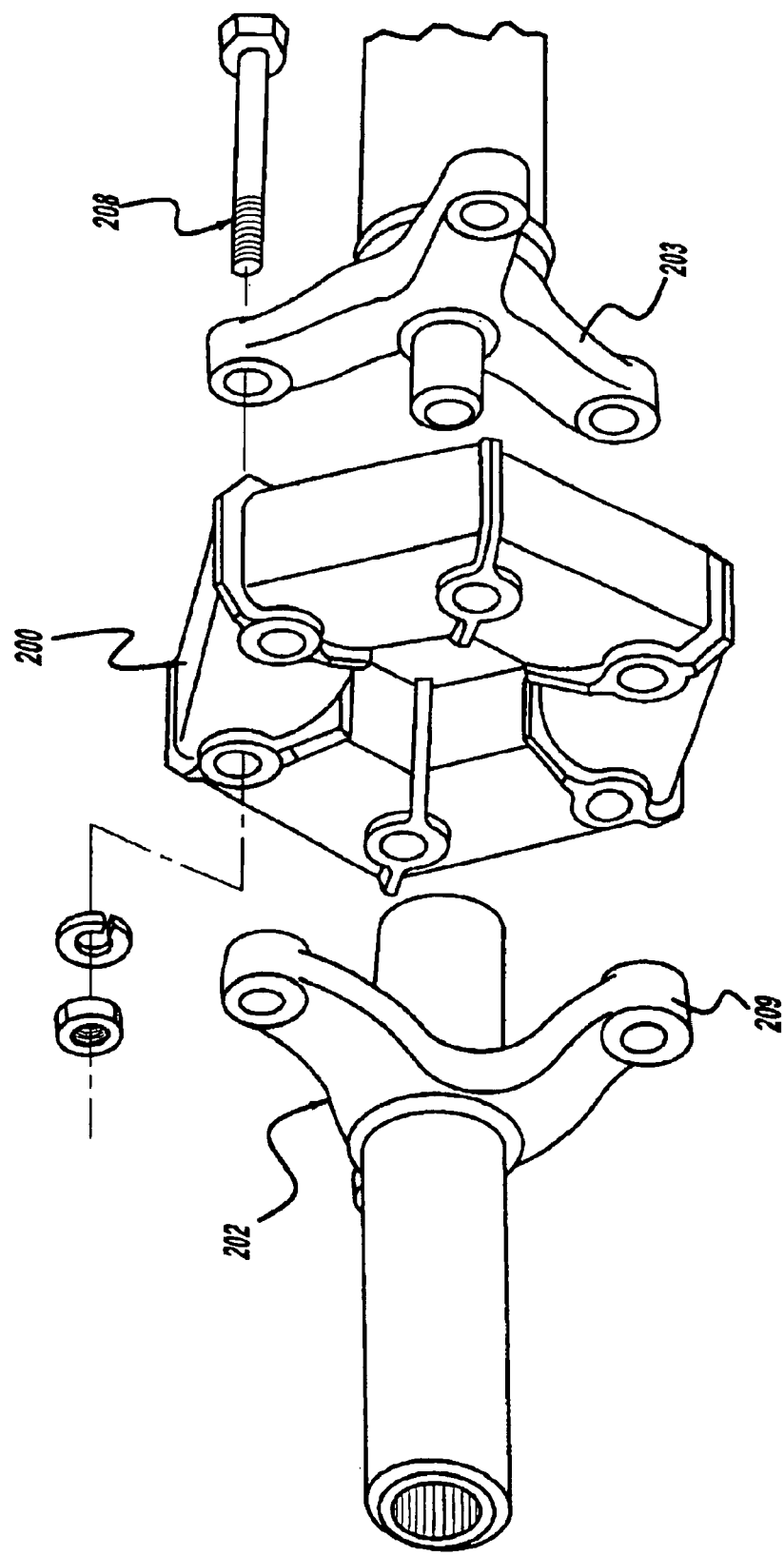
FIG. 13b is an exploded view of the flexible coupling connection.
Figure 33:
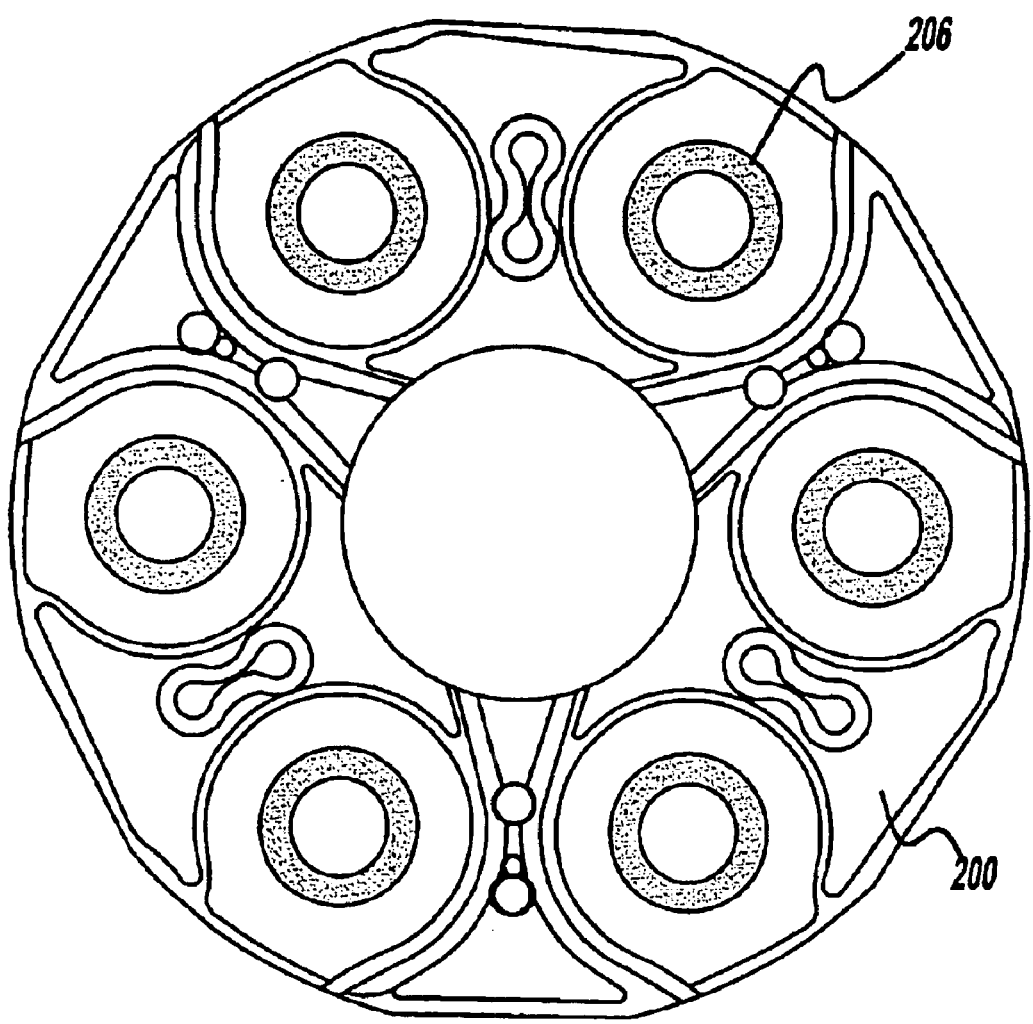
FIG. 33 is a top view of the flexible coupling of the present invention.

In an alternative embodiment of the present invention, a flexible coupling 200, as shown in FIGS. 13 and 33, is used in place of a cardan joint to connect the rear propshaft assembly 24 to the bi-directional clutch. Flexible coupling 200 is also known as a rubber disc joint. The connection is comprised of a pair of flanges 202 and 203, a flexible coupling 200, and a centering device 205 as shown in FIGS. 13a and 13b. Flexible coupling 200 provides the following different characteristics than a cardan joint.

Figure 5:
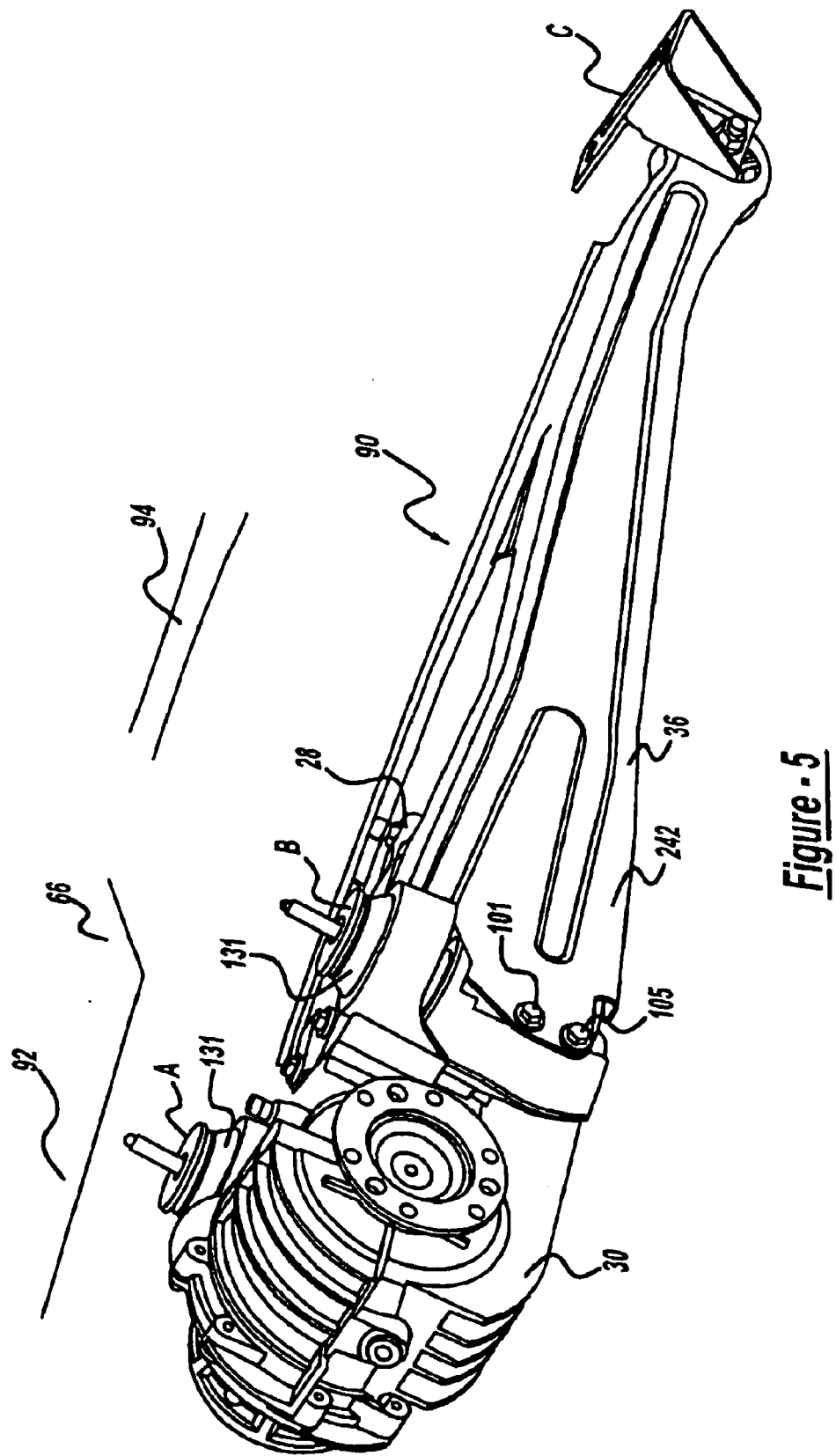
FIG. 5 is a perspective view of the differential, speed sensing torque transfer device, torque arm and torque arm mounting assembly of the present invention.
Figure 6:
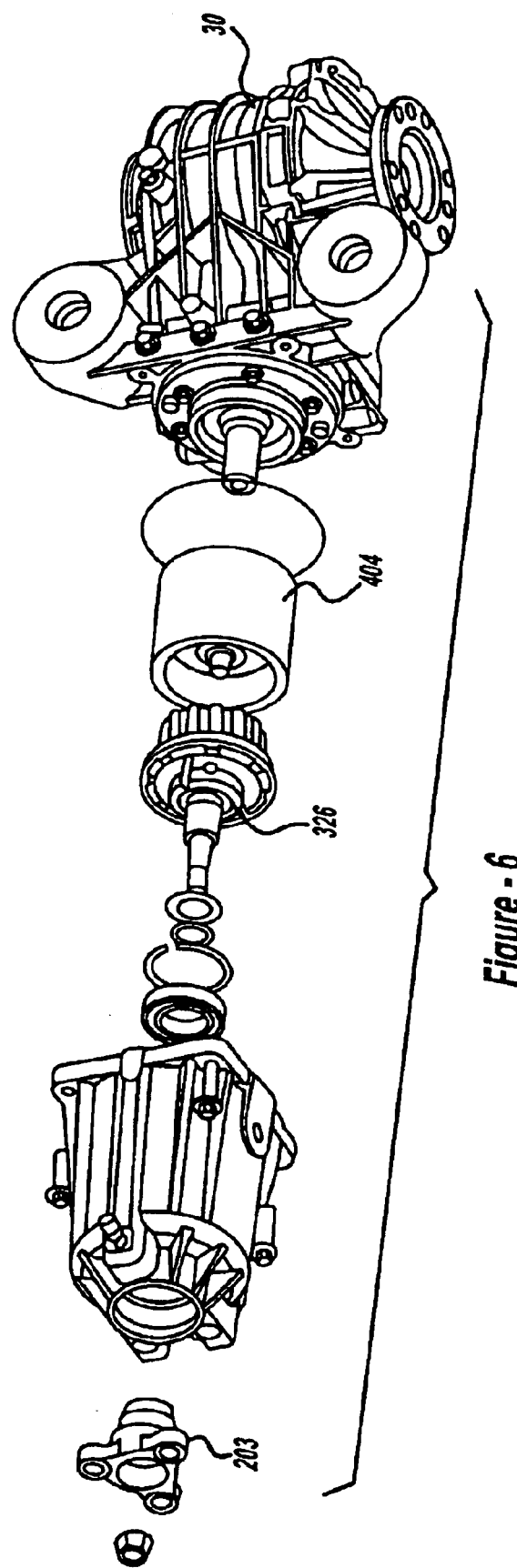
FIG. 6 is an exploded view of the differential and speed sensing torque transfer device of the present invention.
Figure 7:
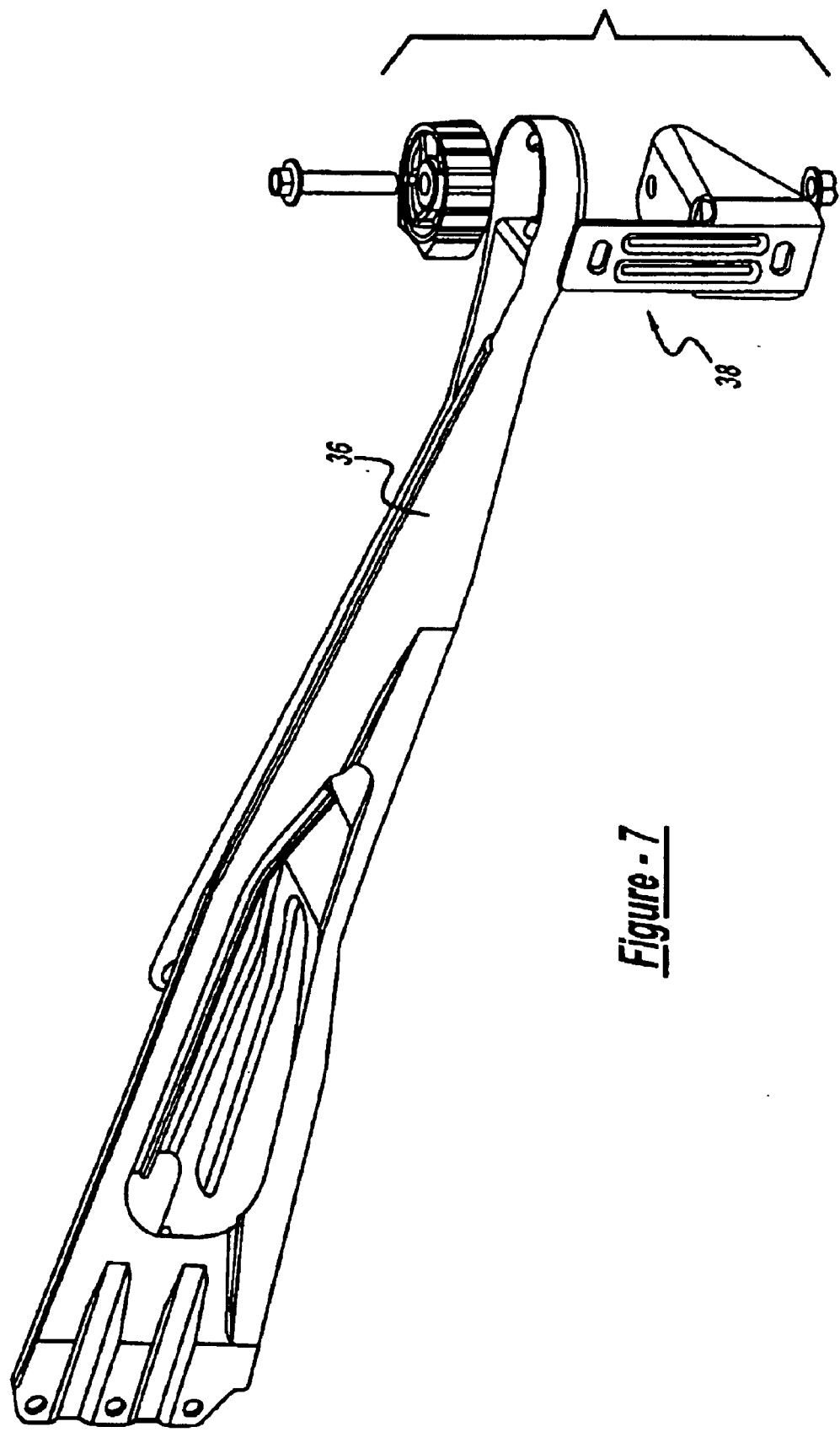
FIG. 7 is a perspective view of the torque arm assembly of the present invention.

Referring now to FIG. 5, the present invention provides the following advantages with respect to the system. The rear differential 30, speed sensing torque transfer device 28 and torque arm 36 combine to form a rear module 90 which is attached to the car frame 92 panel at three points (A, B and C). This attachment reduces noise, harshness and vibration (NVH) via rubber mounts 131 which act to operatively isolate vibrations. Asymmetrical torque arm 36 provides improved packaging flexibility and reduced packaging requirements. Torque arm 36 (shown in FIGS. 5 and 7–9) itself is designed to act as a heat shield against exhaust system components 94 and to protect the temperature sensitive driveline components of the systems while providing structural support described below.

Figure 8:
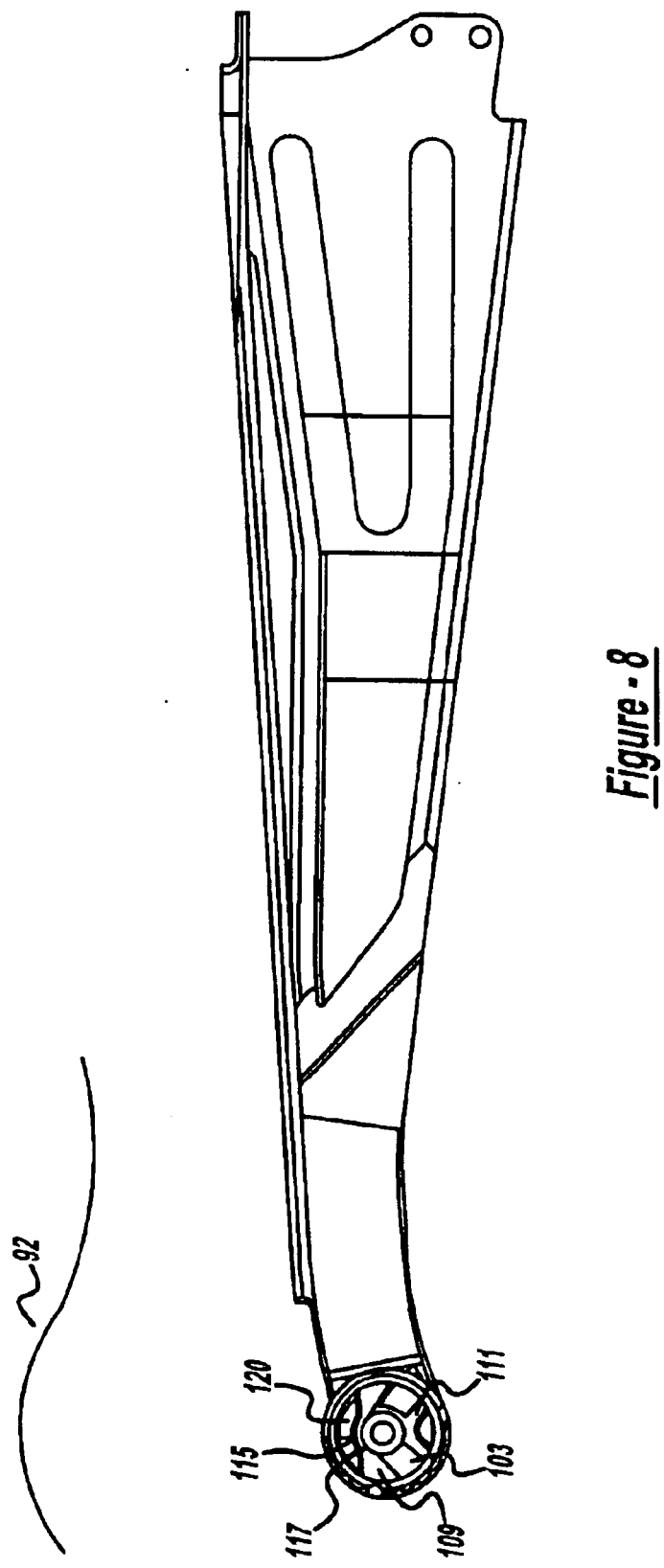
FIG. 8 is an alternative perspective view of the torque arm of the present invention.
Figure 9:
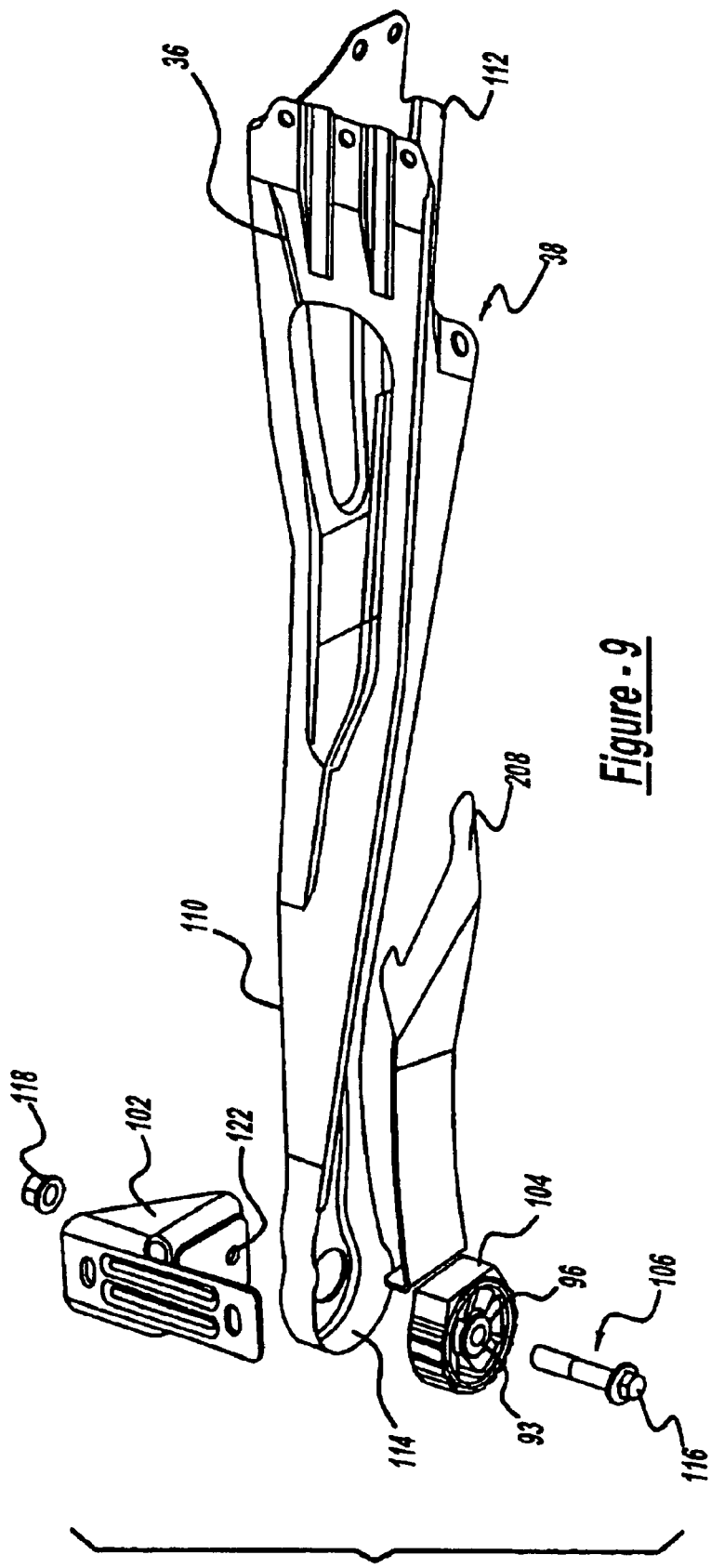
FIG. 9 is yet another alternative perspective view of the torque arm of the present invention.

Referring now to FIG. 9, there is shown torque arm mounting assembly 38. Torque arm mounting assembly 38 includes a torque arm 36, a bracket 102, a compliant mount 104, a fastening system 106, and a cover 208. As shown, the torque arm 36 includes a compliant mounting end 110 and a cover end 112. Torque arm 36 is generally asymmetrical. The compliant mounting end 110 includes a cavity 114 for accepting the compliant mount 104. Compliant mount fits inside cavity 114 and accepts bolt 116, which along with nut 118, comprises the fastening system 104. Bracket 102 is attached to the car frame 92 via any common fastening system. Referring to FIGS. 8 and 9, it is contemplated that the compliant mount 104 is manufactured of rubber and may be tuned to special dampening and stiffness characteristics. Further, the compliant mount 104 includes special dampening cavities 109, and 111, which act to provide a soft initial dampening. Assuming, for example, a reaction force pushing the fastening system 106 toward the car frame 92, the rubber body 103 deforms in the first stage up until the annular section 117 contacts surface 115. With continued force at that stage deformation or compression becomes more difficult, as compressing the top section 120 requires a force strong enough to deform the rubber body 103 and also to compress the upper section 120. Conversely, force in the direction away from the car frame 92 produces the same two stage dampening effect as regards compression of the rubber body 103 and then contact and compression with lower section 121.

Compliant mount 104 compresses an upper section 115, an annular section 117, and a lower section 121. Dampening cavity 109 is located between upper section 120 and annular section 117. Dampening cavity 111 is located between annular section 117 and lower section 115. The compliant provides advantages in connection to the car frame 92 by reducing various noise, harshness and vibration (NVH) characteristics of the powertrain. More specifically, the present design of the compliant mount 104 provides a dampening effect when the displacement is low and frequency is high. Further, the compliant mount 104 reduces "clunk" or initial powertrain engagement noise and harshness by dampening in the driving direction. The compliant mount 104 is manufactured from rubber.

As shown in FIG. 9, compliant mount 104 further includes a tubular bolt section 96 having an internal cavity 93 for accepting bolt 116. Bolt 116 passes through tubular bolt section 96 and also through bolt hole 122. Nut 118 is fastened to bolt 116 in the common fashion to affix the compliant mount 104 to the compliant mounting end 110 of torque arm 36.

Figure 14:
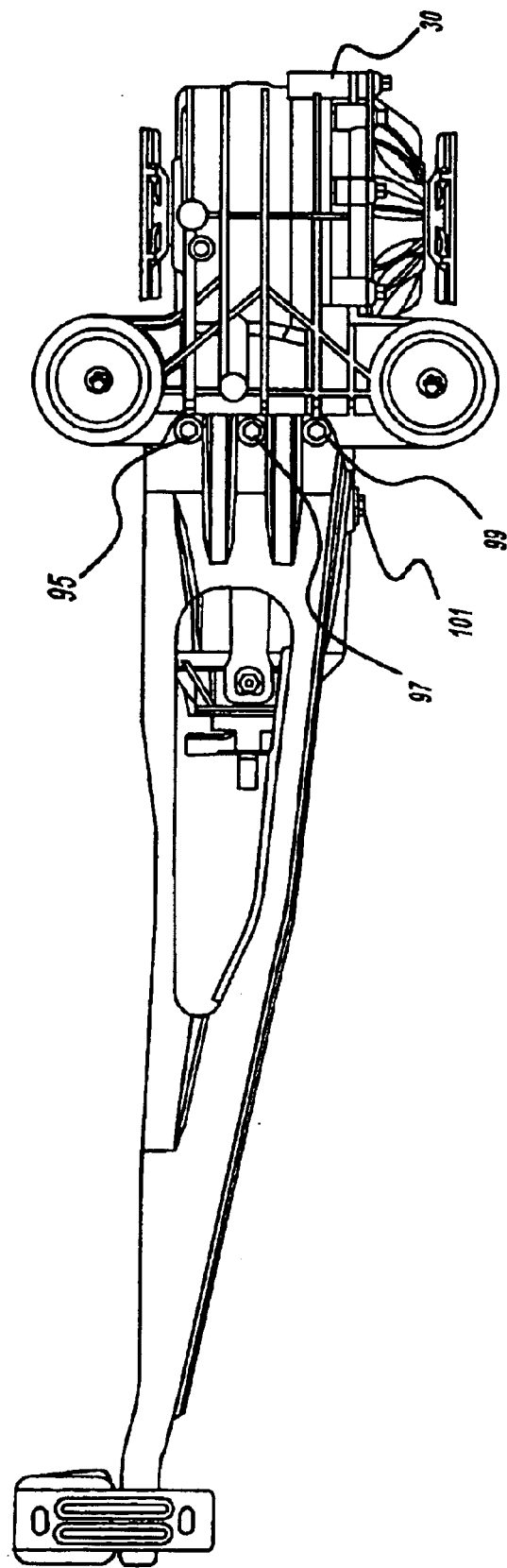
FIG. 14 is a top view of the torque arm assembly differential and sensing torque transfer device.
Figure 15:
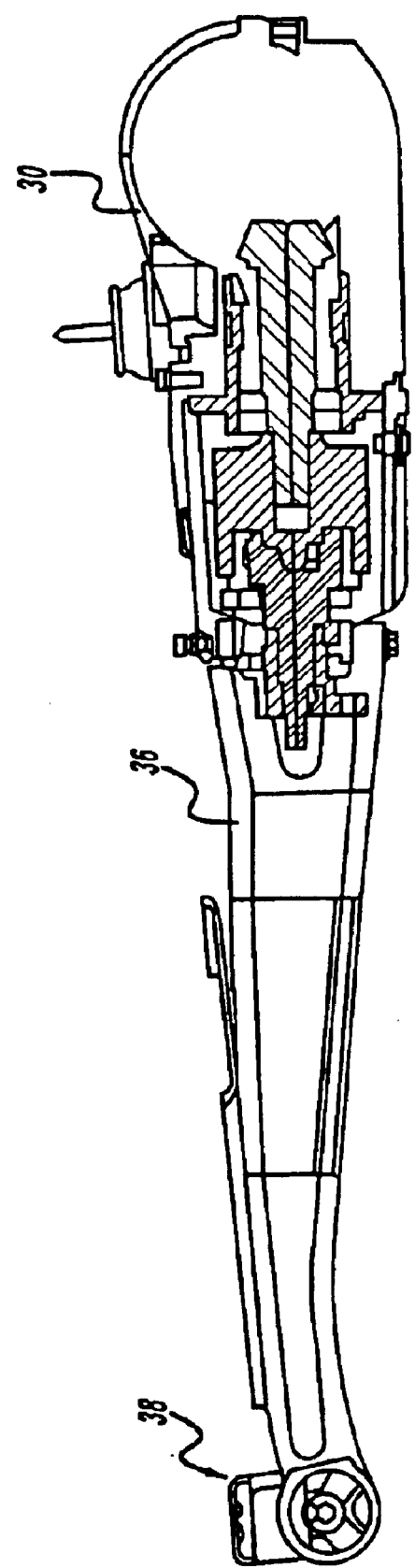
FIG. 15 is a side view of the torque arm assembly differential and sensing torque transfer device.

Referring now to FIG. 14, the torque arm 36 is directly bolted to the outer face of the rear differential by bolts 95, 97 and 99 also shown in FIG. 5. Further, as shown in FIG. 5, there are additional bolts 101 and 105 on side section 242 of torque arm 36 that bolt torque arm 36 to rear differential 30. Referring to the top of rear differential 30, there are shown rubber mounts 131 which attach directly to the undercarriage of the vehicle 92. It is also contemplated that the rubber mounts 131 are tuned for dampening and stiffness characteristics to allow for the appropriate NVH suitability of the vehicle. As an advantage, torque arm 36 in combination with rear differential connections A, B and C form an asymmetrical triangular connection. The torque arm rear differential connection provides for a long span between the torque arm mount 38 and the mounts A and B of rear differential 30. It is known that a longer span allows for a softer tuning of the mounts which reduces the run out and unbalance sensitivity of the rear module 90. Thus, NVH is reduced with a long span. For installation purposes, rear module 90 is completely preassembled with the torque arm 30 bolted directly to the speed sensing torque transfer device 28 and rear differential 30. The preassembled rear module 90 is then bolted to the undercarriage or car frame 92 of the vehicle 66.

In addition, the long span between the torque arm mount 38 and the rear differential mounts 131 allows for soft rubber connections as the load between the rear differential mounts 131 and the torque arm mount are reduced. As it is known, the longer the distance between the torque arm mount 38 and the rear differential mounts 131 reduces the load that must be carried by each individual mounting section. Thus, the NVH characteristics of the entire powertrain system are improved. Torque arm mount 38 is manufactured from a stamped or pressed sheet metal. The rear differential housing 31 is manufactured from aluminum. The rear differential 30 is a standard open rear differential using a bevel gear set. The rear axle ratio has an offset from the front axle ratio between 0.08% to 5% so that while driving on a normal straight direction the rear axle pinion is overrunning the power takeoff unit 17.

Figure 16A:
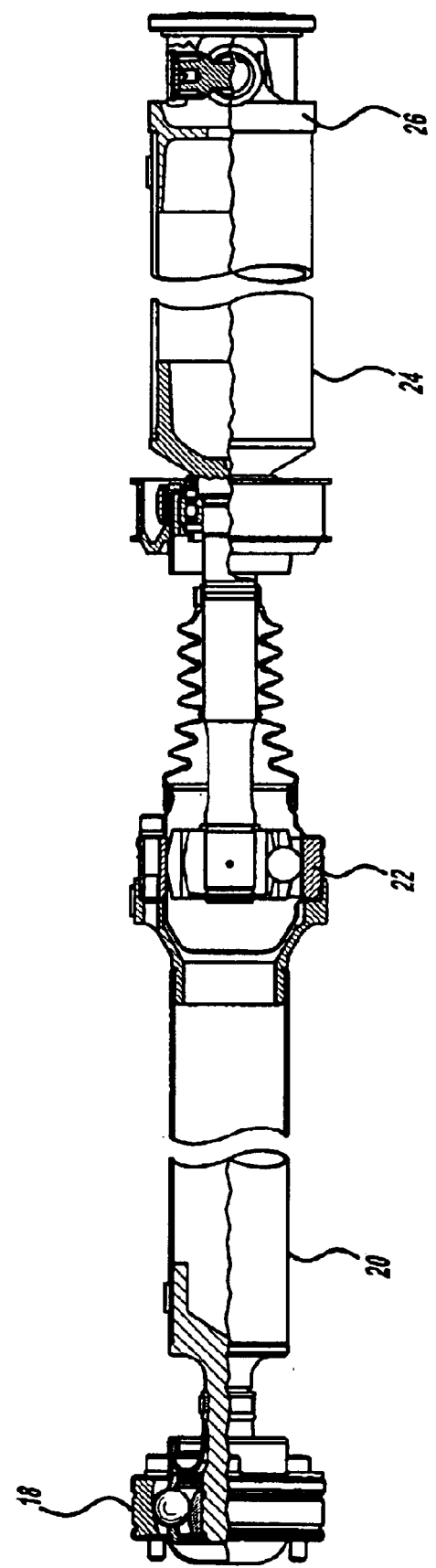
FIG. 16a is a partially cross sectional view of the high speed fixed joint, front propshaft, plunging style VL constant velocity joint, center bearing assembly, rear propshaft and cardan joint assembly.
Figure 17:
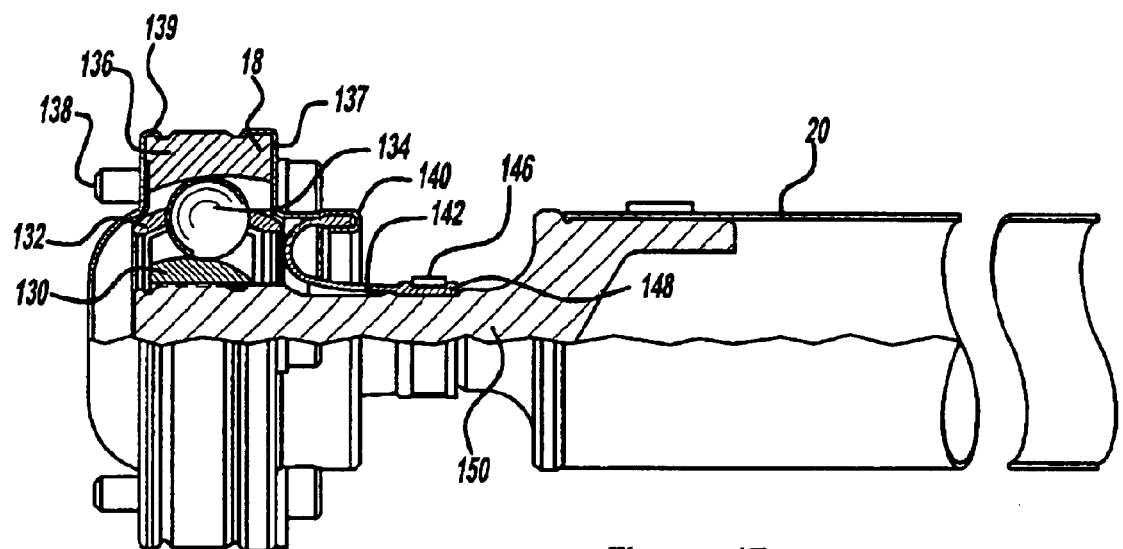
FIG. 17 is an enlarged partially cross sectional view of the high speed fixed joint and front propshaft assembly.

Referring now to FIG. 16a, there is shown generally a partially cross sectional view of the entire propshaft system. FIG. 16a illustrates the high speed fixed joint 18, the front propshaft 20, the VL or cross groove style plunging constant velocity joint 22, the center bearing assembly 70, the rear propshaft 24 and the cardan joint assembly 26. More specifically, FIG. 17 slows a high speed fixed joint 18. High speed fixed joint 18 includes an inner race 130, a cage 132, a plurality of balls (6) represented by reference numeral 134, an outer race 136, a front can portion 137, a rear can portion 139 and a plurality of bolts 138 which are used to compress the front can portion 137 and 139 together to hold the various components in place. As shown in FIG. 17, the constant velocity joint boot 142 which is utilized to hold grease within the constant velocity joint. There is also shown a clamp 146 which clamps end 148 of boot 142 onto the splined section 150 of front propshaft 20. Splined front section 150 interacts with the inner race 130 of high speed fixed joint 18. As is known in the art, torque is thereby transmitted from the splined portion 150 to the inner race 130 through the balls 134 into the outer race 136.

Figure 21:
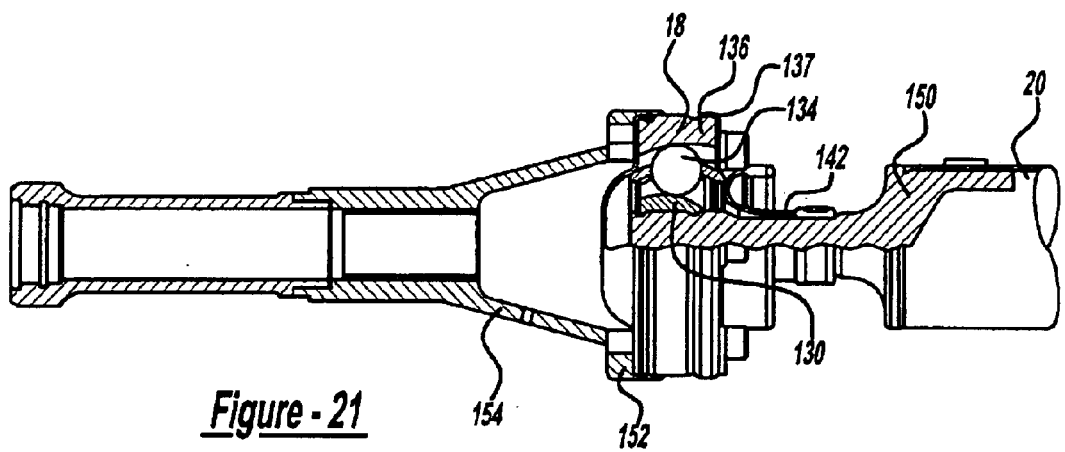
FIG. 21 is a partially cross sectional view of the power take-off unit connection high speed fixed joint and front propshaft.

Referring now to FIG. 21 there is shown high speed fixed joint 18 of the present invention operatively connected to the power transmission take-off connection 154. Power transmission take-off connection 154 includes a shoulder section 152 which is used to connect directly to the outer race of the high speed fixed joint 18. As is shown in FIG. 21, bolts 138 are secured directly to shoulder 152 of the power transmission take-off connection 154. In this manner, torque can be transmitted through section 154 through to the high speed fixed joint 18 and through to the front propshaft 20.

Referring now to FIG. 18, there is shown a partially cross sectional view of the VL type high speed fixed joint 22 and the center bearing assembly 70. Referring now to the end of the front propshaft 20, there is shown a connecting member 160 which is operatively connected to the outer race 170 of the VL type cross groove constant velocity joint 22. The VL type cross groove constant velocity joint includes a inner race 162, a cage 164, (6) balls referenced as reference numeral 166, and as described before an outer race 170. Both the inner and outer races include cross grooves for such cross groove type as known in the art. Cross groove constant velocity plunging joints provide angular excursion of up to 22 degrees and axial plunging movement of up to 525 millimeters. Cross groove joints transmit driveline torque while providing constant rotational velocity at all operating angles and allow for driveline movement caused by engine transmission and suspension travel. High speed cross groove joints as shown in the present invention offer excellent axial movement and excellent NVH performance.

Still referring to FIG. 18, there is shown the front spline portion 172 of the rear propshaft assembly 24. The spline portion 172 extends into the inner race 162 of the VL type cross groove constant velocity joint. Constant velocity joint boot 174 is shown enclosing the constant velocity joint 22 for use in keeping grease inside the joint in operation is kept onto the joint and shaft respectively as shown.

Figure 19:
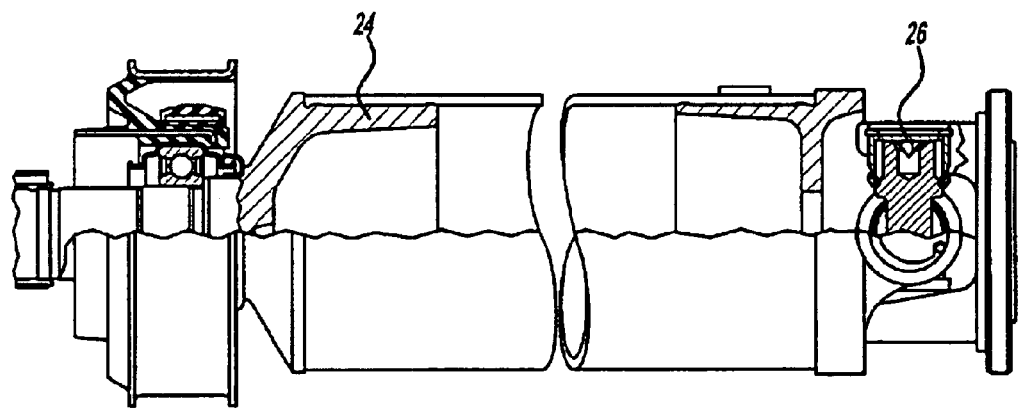
FIG. 19 is a partially cross sectional enlarged view of the center bearing assembly, rear propshaft and cardan joint assembly.
Figure 20:
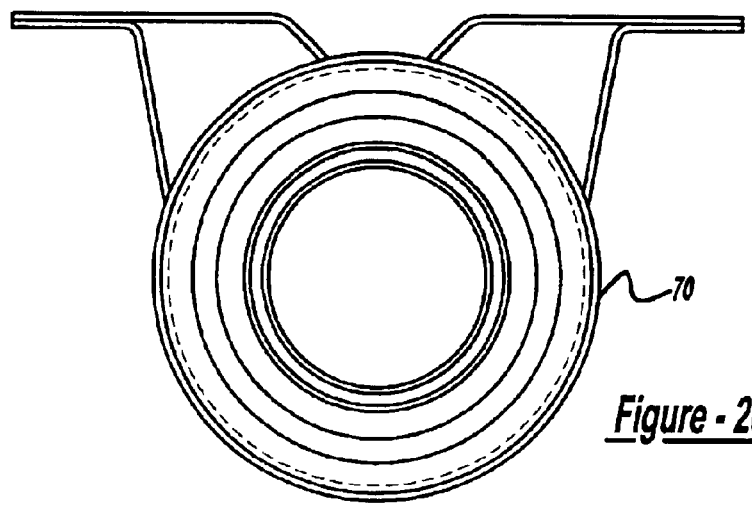
FIG. 20 is a front view of the center bearing assembly looking in a direction toward the rear differential.

Center bearing assembly 70, also shown in FIGS. 18 and 19 and includes a bearing assembly 180, can structure 182 a rubber mounting section 184, a bracket section 186. It can be seen that center bearing assembly 70 allows front portion 172 of the rear propshaft 24 to rotate freely while still being structurally supported by the center bearing assembly. The rubber portion 184 allows for improved NVH slight movements in the drive system. Referring to FIG. 20, there is shown a side view of the center bearing assembly 70 of the present invention looking in a direction towards the rear differential and also down the longitudinal access of the rear propshaft. Referring now to FIGS. 5, 16, and 19, there is shown the rear propshaft assembly 24 including the cardan joint assembly 26. Cardan joint assembly 26 is a standard cardan joint.

Figure 16B:
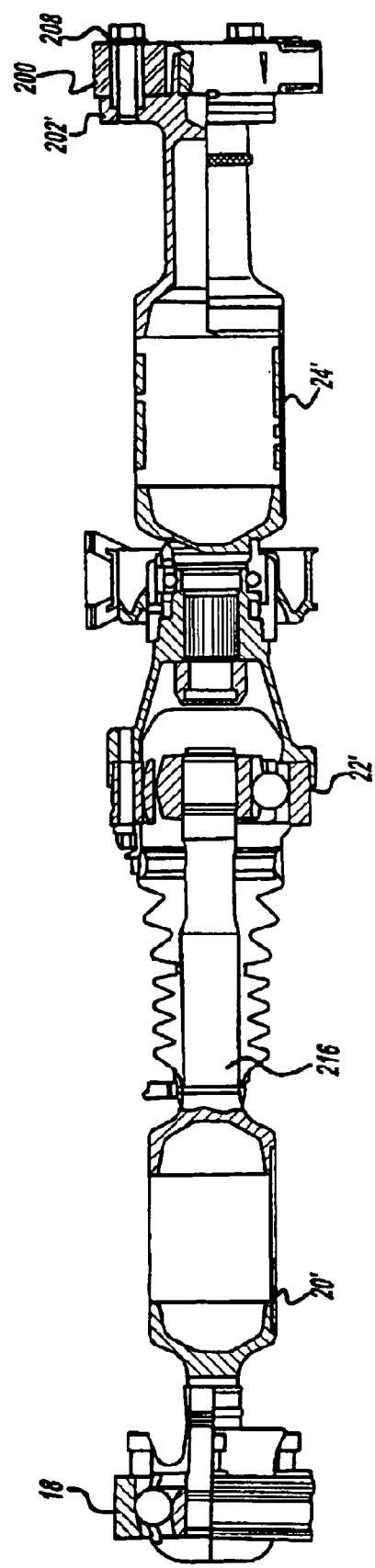
FIG. 16b is a partially cross sectional view of the high speed fixed joint, front propshaft, plunging style VL constant velocity joint, center bearing assembly, rear propshaft and flexible coupling of an alternative embodiment of the present invention.

Referring now to FIG. 16*b*, there is shown an alternative embodiment of the present invention. As shown in FIG. 16*b*, cardan joint 26 is replaced by a flexible coupling. Flexible coupling 200 connects rear propshaft 24' with flange 202. As shown in FIGS. 13*a* and 13*b*, flexible coupling 200 is manufactured from a rubber material. Shown in cross section in FIG. 13*a*, flexible coupling 200 includes a internal disc portion 204 insert molded within the flexible coupling. The flexible coupling further includes six tubular inserts 206 as shown in FIG. 13*b*. Tubular inserts are manufactured from a metal material. The flexible coupling is capable of providing an angular displacement or change in angle of approximately 1 to 3 degrees. The flexible coupling is capable of transferring torque in a range from 1,000 to 3,000 foot pounds. Referring back to FIG. 16*b*, the flexible coupling is attached to the propshaft 24', bolts 208. Three bolts are alternately placed within the flexible coupling and are bolted to the rear propshaft 24'.

Regarding FIG. 13*b*, there is shown flange 202. Flange 202 includes three arm members 209 with respective bolt holes 208. As shown in FIG. 13*a*, flange 203 engages input shaft 326. Splines 212 on the flange matingly engage with splines 214 on the input shaft. Flexible coupling 200 is bolted by bolts that travel through the bolt holes 210 of the flange and also through the tubular inserts 206 of the flexible coupling. In this manner, bolts 208 travel through the flange 202 and through the flexible coupling 200 and, further, bolts 208 travel through the flexible coupling 200 and into the other flange 202. In this manner, the flexible coupling actually couples the rear propshaft 24' with the input shaft 326.

Referring back to FIG. 16*b*, in this alternate embodiment, high speed fixed joint is subverted, such that the front propshaft 20' includes the shaft 216 which engages the inner race 162 the high speed fixed joint 22'.

The entire all wheel drive system must have a first bending frequency response greater than 100 hertz. The advantages of a first bending frequency response greater than 100 hertz are that this frequency is far enough above the initial speed and will reduce excitation by runout and unbalance related to first order propshaft conditions.

What is claimed is:

1. An all wheel drive system for a motor vehicle comprising:
   a front differential;
   a pair of front halfshaft assemblies operatively connected to said front differential whereby said front differential supplies torque to said pair of front half shaft assemblies, each of said pair of front half shaft assemblies connected to a respective front wheel;
   a power takeoff unit operatively connected to said front differential;
   a constant velocity joint connected to said power takeoff unit whereby said front differential supplies torque to said constant velocity joint through said power takeoff unit;
   a first propshaft having a first end and a second end, said first end connected to said constant velocity joint;
   a plunging constant velocity joint connected to said second end of said first propshaft;
   a second propshaft having a first end and a second end, said first end connected to said plunging constant velocity joint;
   a flexible coupling having a first end and a second end, said first end of said flexible coupling connected to said second end of said second propshaft;
   a self contained speed sensing torque transfer assembly connected to said second end of said flexible coupling such that torque is selectively transferrable when said self contained speed sensing torque transfer assembly is engaged, said self contained speed sensing torque transfer assembly including; a bi-directional overrunning clutch connected at one end to said second end of said flexible coupling, and connected at the other end to a viscous coupling;
   a rear differential connected to said viscous coupling; and
   a pair of rear halfshaft assemblies operatively connected to said rear differential for transferring torque to said rear halfshaft assemblies, each of said rear halfshaft assemblies connected to a respective rear wheel whereby under normal operating conditions said all wheel drive system provides substantially all torque to said front differential, and in a slip condition when either of said front wheels begins to slip said front differential rotates at a higher speed than said rear differential and said self contained speed sensing torque transfer assembly engages thereby providing torque to said rear differential until said slip condition is resolved whereupon substantially all torque is transferred back to the front wheels.

2. The all wheel drive system of claim 1 further comprising:
   a torque arm connected to said rear differential and to said motor vehicle to support said rear differential and to reduce the torque reaction of said rear differential.

3. An all wheel drive system for a motor vehicle comprising:
   a front differential;
   a pair of front halfshaft assemblies operatively connected to said front differential whereby said front differential supplies torque to said pair of front half shaft assemblies, each of said pair of front half shaft assemblies connected to a respective front wheel;
   a power takeoff unit operatively connected to said front differential;
   a constant velocity joint connected to said power takeoff unit whereby said front differential supplies torque to said constant velocity joint through said power takeoff unit;
   a first propshaft having a first end and a second end, said first end connected to said constant velocity joint;
   a plunging constant velocity joint connected to said second end of said first propshaft;
   a second propshaft having a first end and a second end, said first end connected to said plunging constant velocity joint;
   a universal joint having a first end and a second end, said first end of said universal joint connected to said second end of said second propshaft;
   a self contained speed sensing torque transfer assembly connected to said second end of said universal joint such that torque is selectively transferrable when said self contained speed sensing torque transfer assembly is engaged, said self contained speed sensing torque transfer assembly including; a bi-directional overrunning clutch connected at one end to said second end of said universal joint, and connected at the other end to a viscous coupling;

a rear differential connected to said viscous coupling; and a pair of rear halfshaft assemblies operatively connected to said rear differential for transferring torque to said rear halfshaft assemblies, each of said rear halfshaft assemblies connected to a respective rear wheel whereby under normal operating conditions said all wheel drive system provides substantially all torque to said front differential, and in a slip condition when either of said front wheels begins to slip said front differential rotates at a higher speed than said rear differential and said self contained speed sensing torque transfer assembly engages thereby providing torque to said rear differential until said slip condition is resolved whereupon substantially all torque is transferred back to the front wheels.

4. The all wheel drive system of claim 3 further comprising:

a torque arm connected to said rear differential and to said motor vehicle to support said rear differential and to reduce the torque reaction of said rear differential.

5. An all wheel drive system for a motor vehicle comprising:

a front differential for providing driving torque to said motor vehicle, said front differential having a front differential gear ratio;

a power takeoff unit operatively connected to said front differential;

a propshaft assembly operatively connected to said power takeoff unit;

a bi-directional overrunning clutch connected to said propshaft assembly;

a viscous coupling connected to said bi-directional overrunning clutch;

a rear differential connected to said viscous coupling, said rear differential having a rear gear ratio greater than said front differential by a range from 0.08% to 5% allowing said rear differential to overrun said front differential in normal operating conditions, and whereby under normal operating conditions said all wheel drive system provides substantially all torque to said front differential, and in a slip condition when said front differential begins to rotate faster than said rear differential the bi-directional clutch engages and passes driving torque to said viscous coupling and said viscous coupling progressively engages and provides driving torque to said rear differential until said slip condition is resolved.

6. The all wheel drive system of claim 5, where said range is from 0.2% to 5%.

7. The all wheel drive system of claim 5, where said range is from 0.75% to 2%.

8. An all wheel drive system for a motor vehicle comprising:

a front differential;

a pair of front halfshaft assemblies operatively connected to said front differential whereby said front differential supplies torque to said pair of front half shaft assemblies, each of said pair of front half shaft assemblies connected to a respective front wheel;

a power takeoff unit operatively connected to said front differential;

a constant velocity joint connected to said power takeoff unit whereby said front differential supplies torque to said constant velocity joint through said power takeoff unit;

a first propshaft having a first end and a second end, said first end connected to said constant velocity joint;

a plunging constant velocity joint connected to said second end of said first propshaft;

a second propshaft having a first end and a second end, said first end connected to said plunging constant velocity joint, said second propshaft manufactured from a carbon fiber reinforced plastic material having a longitudinal stiffness to density ratio in a range from 3 to 9, a fiber by volume ratio greater that 50% and a winding angle of 60° or less;

a flexible coupling having a first end and a second end, said first end of said flexible coupling connected to said second end of said second propshaft;

a self contained speed sensing torque transfer assembly connected to said second end of said flexible coupling such that torque is selectively transferrable when said self contained speed sensing torque transfer assembly is engaged, said self contained speed sensing torque transfer assembly including; a bi-directional overrunning clutch connected at one end to said second end of said flexible coupling, and connected at the other end to a viscous coupling;

a rear differential connected to said viscous coupling; and a pair of rear halfshaft assemblies operatively connected to said rear differential for transferring torque to said rear halfshaft assemblies, each of said rear halfshaft assemblies connected to a respective rear wheel whereby under normal operating conditions said all wheel drive system provides substantially all torque to said front differential, and a slip condition when either of said front wheels begins to slip said front differential rotates at a higher speed than said rear differential and said self contained speed sensing torque transfer assembly engages thereby providing torque to said rear differential until said slip condition is resolved whereupon substantially all torque is transferred back to the front wheels.

9. An all wheel drive system for a motor vehicle comprising:

a front differential;

a pair of front halfshaft assemblies operatively connected to said front differential whereby said front differential supplies torque to said pair of front half shaft assemblies, each of said pair of front half shaft assemblies connected to a respective front wheel;

a power takeoff unit operatively connected to said front differential;

a constant velocity joint connected to said power takeoff unit whereby said front differential supplies torque to said constant velocity joint through said power takeoff unit;

a first propshaft having a first end and a second end, said first end connected to said constant velocity joint;

a plunging constant velocity joint connected to said second end of said first propshaft;

a second propshaft having a first end and a second end, said first end connected to said plunging constant velocity joint, said second propshaft manufactured from a carbon fiber reinforced plastic material having a torsional stiffness to density ratio in a range from 1 to 2.2, a fiber by volume ratio greater that 50% and a winding angle of 60° or less;

a flexible coupling having a first end and a second end, said first end of said flexible coupling connected to said second end of said second propshaft;

a self contained speed sensing torque transfer assembly connected to said second end of said flexible coupling such that torque is selectively transferrable when said self contained speed sensing torque transfer assembly is engaged, said self contained speed sensing torque transfer assembly including; a bi-directional overrunning clutch connected at one end to said second end of said flexible coupling;

a rear differential connected to said viscous coupling; and a pair of rear halfshaft assemblies operatively connected to said rear differential for transferring torque to said rear halfshaft assemblies, each of said rear halfshaft assemblies connected to a respective rear wheel whereby under normal operating conditions said all wheel drive system provides substantially all torque to said front differential, and in a slip condition when either of said front wheels begins to slip said front differential rotates at a higher speed than said rear differential and said self contained speed sensing torque transfer assembly engages thereby providing torque to said rear differential until said slip condition is resolved whereupon substantially all torque is transferred back to the front wheels.

10. An all wheel drive system for a motor vehicle comprising:

a front differential;

a pair of front halfshaft assemblies operatively connected to said front differential whereby said front differential supplies torque to said pair of front half shaft assemblies, each of said pair of front half shaft assemblies connected to a respective front wheel;

a power takeoff unit operatively connected to said front differential;

a constant velocity joint connected to said power takeoff unit whereby said front differential supplies torque to said constant velocity joint through said power takeoff unit;

a first propshaft having a first end and a second end, said first end connected to said constant velocity joint;

a plunging constant velocity joint connected to said second end of said first propshaft;

a second propshaft having a first end and a second end, said first end connected to said plunging constant velocity joint, said second propshaft manufactured from a carbon fiber reinforced plastic material having a longitudinal stiffness to density ratio in a range from 3 to 9, a fiber by volume ratio greater that 50% and a winding angle of 60° or less;

a universal joint having a first end and a second end, said first end of said universal joint connected to said second end of said second propshaft;

a self contained speed sensing torque transfer assembly connected to said second end of said universal joint such that torque is selectively transferrable when said self contained speed sensing torque transfer assembly is engaged, said self contained speed sensing torque transfer assembly including; a bi-directional overrunning clutch connected at one end to said second end of said universal joint, and connected at the other end to a viscous coupling;

a rear differential connected to said viscous coupling; and a pair of rear halfshaft assemblies operatively connected to said rear differential for transferring torque to said rear halfshaft assemblies, each of said rear halfshaft assemblies connected to a respective rear wheel whereby under normal operating conditions said all wheel drive system provides substantially all torque to said front differential, and a slip condition when either of said front wheels begins to slip said front differential rotates at a higher speed than said rear differential and said self contained speed sensing torque transfer assembly engages thereby providing torque to said rear differential until said slip condition is resolved whereupon substantially all torque is transferred back to the front wheels.

11. An all wheel drive system for a motor vehicle comprising:

a front differential;

a pair of front halfshaft assemblies operatively connected to said front differential whereby said front differential supplies torque to said pair of front half shaft assemblies, each of said pair of front half shaft assemblies connected to a respective front wheel;

a power takeoff unit operatively connected to said front differential;

a constant velocity joint connected to said power takeoff unit whereby said front differential supplies torque to said constant velocity joint through said power takeoff unit;

a first propshaft having a first end and a second end, said first end connected to said constant velocity joint;

a plunging constant velocity joint connected to said second end of said first propshaft;

a second propshaft having a first end and a second end, said first end connected to said plunging constant velocity joint, said second propshaft manufactured from a carbon fiber reinforced plastic material having a torsional stiffness to density ratio in a range from 1 to 2.2, a fiber by volume ratio greater that 50% and a winding angle of 60° or less;

a universal joint having a first end and a second end, said first end of said universal joint connected to said second end of said second propshaft;

a self contained speed sensing torque transfer assembly connected to said second end of said universal joint such that torque is selectively transferrable when said self contained speed sensing torque transfer assembly is engaged, said self contained speed sensing torque transfer assembly including; a bi-directional overrunning clutch connected at one end to said second end of said universal joint;

a rear differential connected to said viscous coupling; and a pair of rear halfshaft assemblies operatively connected to said rear differential for transferring torque to said rear halfshaft assemblies, each of said rear halfshaft assemblies connected to a respective rear wheel whereby under normal operating conditions said all wheel drive system provides substantially all torque to said front differential, and in a slip condition when either of said front wheels begins to slip said front differential rotates at a higher speed than said rear differential and said self contained speed sensing torque transfer assembly engages thereby providing torque to said rear differential until said slip condition is resolved whereupon substantially all torque is transferred back to the front wheels.

12. An all wheel drive system for a motor vehicle comprising:

a front differential;

a pair of front halfshaft assemblies operatively connected to said front differential whereby said front differential supplies torque to said pair of front half shaft assemblies, each of said pair of front half shaft assemblies connected to a respective front wheel;

a power takeoff unit operatively connected to said front differential;

a constant velocity joint connected to said power takeoff unit whereby said front differential supplies torque to said constant velocity joint through, said power takeoff unit;

a first propshaft having a first end and a second end, said first end connected to said constant velocity joint;

a plunging constant velocity joint connected to said second end of said first propshaft;

a second propshaft having a first end and a second end, said first end connected to said plunging constant velocity joint;

a flexible coupling having a first end and a second end, said first end of said flexible coupling connected to said second end of said second propshaft;

a bi-directional overrunning clutch connected to said second end of said flexible coupling;

a viscous coupling operatively connected to said bi-directional overrunning clutch;

a rear differential connected to said viscous coupling; and a pair of rear halfshaft assemblies operatively connected to said rear differential for transferring torque to said rear halfshaft assemblies, each of said rear halfshaft assemblies connected to a respective rear wheel whereby under normal operating conditions said all wheel drive system provides substantially all torque to said front differential, and in a slip condition when either of said front wheels begins to slip said front differential rotates at a higher speed than said rear differential and said viscous coupling engages thereby providing torque to said rear differential until said slip condition is resolved whereupon substantially all torque is transferred back to the front wheels.

13. An all wheel drive system for a motor vehicle comprising:

a front differential;

a pair of front halfshaft assemblies operatively connected to said front differential whereby said front differential supplies torque to said pair of front half shaft assemblies, each of said pair of front half shaft assemblies connected to a respective front wheel;

a power takeoff unit operatively connected to said front differential;

a constant velocity joint connected to said power takeoff unit whereby said front differential supplies torque to said constant velocity joint through said power takeoff unit;

a first propshaft having a first end and a second end, said first end connected to said constant velocity joint;

a plunging constant velocity joint connected to said second end of said first propshaft;

a second propshaft having a first end and a second end, said first end connected to said plunging constant velocity joint;

a flexible coupling having a first end and a second end, said first end of said flexible coupling connected to said second end of said second propshaft;

a self contained speed sensing torque transfer assembly connected to said second end of said flexible coupling such that torque is selectively transferrable when said self contained speed sensing torque transfer assembly is engaged, said self contained speed sensing torque transfer assembly including; a bi-directional overrunning clutch connected at one end to said second end of said flexible coupling, and connected at the other end to a viscous coupling;

a rear differential having an overrunning gear ratio offset, said rear differential connected to said viscous coupling and including a rear axle pinion; and a pair of rear halfshaft assemblies operatively connected to said rear differential for transferring torque to said rear halfshaft assemblies, each of said rear halfshaft assemblies connected to a respective rear wheel whereby under normal operating conditions said all wheel drive system provides substantially all torque to said front differential, and in a slip condition when either of said front wheels begins to slip said front differential rotates at a higher speed than said rear axle pinion and said self contained speed sensing torque transfer assembly engages thereby providing torque to said rear differential until said slip condition is resolved whereupon substantially all torque is transferred back to the front wheels.

* * * * *